(12) United States Patent
Mukai

(10) Patent No.: US 8,774,621 B2
(45) Date of Patent: Jul. 8, 2014

(54) COMMUNICATION LINE SWITCHING METHOD, COMMUNICATION APPARATUS, STATION-SIDE COMMUNICATION APPARATUS, COMMUNICATION SYSTEM, AND CONTROL UNIT

(75) Inventor: Hiroaki Mukai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/695,525

(22) PCT Filed: Nov. 25, 2010

(86) PCT No.: PCT/JP2010/006863
§ 371 (c)(1),
(2), (4) Date: Oct. 31, 2012

(87) PCT Pub. No.: WO2012/070089
PCT Pub. Date: May 31, 2012

(65) Prior Publication Data
US 2013/0045010 A1 Feb. 21, 2013

(51) Int. Cl.
*G02F 1/00* (2006.01)
(52) U.S. Cl.
USPC ............ 398/5; 398/1; 398/3; 398/17; 398/25; 398/33; 398/38; 398/72; 398/70; 398/71; 398/100; 398/45; 398/52; 398/154; 398/155; 398/58; 370/352; 370/392; 370/389; 370/468; 370/230

(58) Field of Classification Search
USPC ............ 398/1, 2, 3, 4, 5, 7, 8, 33, 38, 25, 26, 398/27, 66, 67, 68, 70, 71, 72, 98, 99, 100, 398/58, 154, 155, 158, 159, 69, 45, 52, 10, 398/13, 17; 370/352, 392, 389, 468, 503, 370/230, 350, 442, 395.41, 342, 351
See application file for complete search history.

(56) References Cited

U.S. PATENT DOCUMENTS 8,433,194 B2 * 4/2013 Nesset et al. ............... 398/58
2009/0067835 A1 * 3/2009 Chen ............................ 398/45

(Continued)

FOREIGN PATENT DOCUMENTS

JP  11 296700    10/1999
JP  2001 119345  4/2001

(Continued)

OTHER PUBLICATIONS

Office Action issued Nov. 27, 2012 in Japanese Patent Application No. 2012-545537 with English language translation.

(Continued)

*Primary Examiner* — Hanh Phan
(74) *Attorney, Agent, or Firm* — Oblon, Spivak, McClelland, Maier & Neustadt, L.L.P.

(57) ABSTRACT

In a communication line switching method for an optical communications system in which a station-side line terminal apparatus and user-side line terminal apparatuses are connected via a plurality of redundant physical lines, the discovery of the station-side optical line terminal registering the user-side line terminal apparatuses, wherein the registered user-side line terminal apparatuses monitoring a time stamp drift error that is generated when a difference between a time stamp included in a received signal and a local time measured by the own apparatus is larger than a value set in advance and, when the time stamp drift error occurs, shifting to a deregistered state and waiting for registration by the discovery. The station-side line terminal apparatus switches a physical line from a working physical line to a backup physical line of the physical lines. The user-side line terminal apparatus shifting to a holdover state for suppressing a shift to the deregistered state due to occurrence of the time stamp drift error during monitoring in a holdover period set in advance even if line abnormality is detected.

29 Claims, 13 Drawing Sheets

(56) References Cited

U.S. PATENT DOCUMENTS

| | | | |
|---|---|---|---|
| 2010/0098407 A1* | 4/2010 | Goswami et al. | 398/5 |
| 2011/0013903 A1* | 1/2011 | Rafel Porti et al. | 398/1 |
| 2011/0044683 A1* | 2/2011 | Trojer | 398/1 |

FOREIGN PATENT DOCUMENTS

| | | |
|---|---|---|
| JP | 2001-177551 A | 6/2001 |
| JP | 2002 198904 | 7/2002 |
| JP | 2009 65341 | 3/2009 |
| JP | 2009 246446 | 10/2009 |
| JP | 2010 239552 | 10/2010 |
| WO | 2008 126162 | 10/2008 |

OTHER PUBLICATIONS

IEEE P1904.1, "Service Interoperability in Ethernet Passive Optical Networks (SIEPON), D0.9," IEEE, Total 9 Pages, (Oct. 8, 2010).

IEEE Standard for Information technology Telecommunications and information exchange between systems Local and metropolitan area networks Specific requirements, "Carrier Sense Multiple Access with Collision Detection (CSMA/CD) access method and physical Layer specifications," IEEE 802.3, pp. 1-57; 59-149; 151-207; 209-243; 245-331; 333-375; 377-381; 383-397; 399-451; 453-517; 519-573; 575-579; 581-589; 591-595; 597-609-; 611-615, (2008).

IEEE Standard for Information technology Telecommunications and information exchange between systems Local and metropolitan area networks Specific requirements, "Carrier Sense Multiple Access with Collision Detection (CSMA/CD) access method and physical Layer specifications," IEEE 802.3av, pp. i-xix; 1-3; 5-37; 39-41; 43-81; 83-85; 87-89; 91-141; 143-214, (Oct. 30, 2009).

ITU-T, "A broadband optical access system with enhanced survivability," ITU-T Recommendation G.983.5, Total 58 Pages, (Jan. 2002).

International Search Report Issued Dec. 21, 2010 in PCT/JP10/006863 Filed Nov. 25, 2010.

Japanese Office Action issued Dec. 10, 2013, in Japan Patent Application No. 2013-051656 (with English translation).

Extended European Search Report issued May 8, 2014, in European Patent Application No. 10859995.2.

Mangin et al., "Type B Optical Link Protection," IEEE Draft; SIEPON, IEEE-SA, vol. 802.1, Oct. 19, 2010, pp. 1-7.

Draft Amendment to IEEE Std., IEEE 802.3av, 1OG-EPON Task Force, 802.3av/D1.3, Apr. 23, 2008, pp. 100-181.

Service Availability 9, IEE P1904.1, SIEPON, vol. 802.1, No. DO.2, Aug. 26, 2010, pp. 1-19.

* cited by examiner

US 8,774,621 B2

COMMUNICATION LINE SWITCHING METHOD, COMMUNICATION APPARATUS, STATION-SIDE COMMUNICATION APPARATUS, COMMUNICATION SYSTEM, AND CONTROL UNIT

FIELD

The present invention relates to a communication system connected by redundant notification lines and a communication method and relates to, for example, a communication system configured by an OLT (Optical Line Terminal) and a plurality of ONUs (Optical Network Unit).

BACKGROUND

A communication system with solidity against communication failures increased by redundantly connecting communication terminals using a plurality of lines has been devised. When a communication apparatus detects a communication failure in a line in use, such a communication system suspends the use of the line in which the failure occurs, establishes a link in another communication line, and resumes communication.

Japanese Patent Application Laid-open No. 2001-119345 discloses an optical communication system in which an OLT and a star coupler are connected by redundant two optical fibers (Patent Literature 1).

International Publication No. WO2008/126162 discloses a protection system that switches a line in use from a working optical fiber to a backup optical fiber when an OLT does not receive an upstream signal from ONUs.

The IEEE (The Institute of Electrical and Electronic Engineers) 802.3av standard specifies a communication protocol in which an optical line is used. In a PON system, because a plurality of ONUs communicate with an OLT in time-division multiple access using a common line, the ONUs need to accurately transmit data at allocated timing. Therefore, the OLT controls synchronization among the ONUs using a downstream control message. The OLT inserts a timestamp based on an own clock reference into the downstream control message and notifies the ONUs of reference time. The ONU extracts the timestamp from the received downstream control message and updates, as a PON (Passive Optical Network) counter value, a local timer serving as a timing reference for transmission and reception.

The OLT frequently transmits the downstream control message including the timestamp. Therefore, the ONU can check a difference between the timestamp included in a received signal and the own PON counter and always monitor out of synchronization and line abnormality. When the timestamp and the PON counter deviate by a degree equal to or larger than a threshold, the ONU has to detect a timestamp drift error, disconnect a logical link, and return to an initial state. In the ONU having returned to the initial state, a logical link is set anew by discovery processing by the OLT. The ONU can resume communication through necessary synchronization and resetting of control information.

CITATION LIST

Patent Literature

Patent Literature 1: Japanese Patent Application Laid-open No. 2001-119345 (FIG. 1)

Patent Literature 2: International Publication No. WO2008/126162

SUMMARY

Technical Problem

In the communication system in the past, when a communication failure occurs in a working line, a slave station apparatus (ONU) detects the failure and attempts to reestablish a communication link. Therefore, there is a problem in that it takes time until communication is resumed using a backup line.

Solution to Problem

In order to solve the aforementioned problems, a communication line switching method for an optical communication system in which a station-side optical line terminal apparatus (hereinafter referred to as OLT) and user-side optical line terminal apparatuses (hereinafter referred to as ONUs) are connected via a plurality of redundant physical lines according to one aspect of the present invention is configured to include: a discovery step of the OLT registering the ONU; a monitoring step of the registered ONU monitoring a time stamp drift error that is generated when a difference between a time stamp included in a received signal and a local time measured by the own apparatus is larger than a value set in advance and, when the time stamp drift error occurs, shifting to a deregistered state and waiting for registration by the discovery step; a switching step of the OLT switching a physical line from a working physical line to a backup physical line of the physical lines; and a holdover step of the ONU in the registered state shifting to an holdover state for suppressing a shift to the deregistered state due to occurrence of the time stamp drift error by the monitoring step in a holdover period set in advance even if line abnormality is detected.

A communication apparatus according to another aspect of the present invention is configured to include: a transceiver connected to a physical line and configured to transmit and receive a transmission signal using a logical link; a timer configured to measure a local time; a first warning unit configured to output an out-of-synchronization error based on a difference between time information of the transmission signal received by the transceiver and the local time; a second warning unit configured to detect line abnormality in the physical line based on a transmission interval of transmission signals received by the transceiver; and a control unit configured to shift to a deregistered state and perform initial setting when the out-of-synchronization error by the first warning unit is output and, on the other hand, when the second warning unit detects abnormality, during a period set in advance, suppress the shift to the deregistered state due to the out-of-synchronization error by the first warning unit.

A station-side communication apparatus that performs communication with a plurality of user-side communication apparatuses via a plurality of redundant physical lines and a splitter that divides signals of the physical lines to a plurality of signal lines according to further aspect of the present invention is configured to include: a plurality of transceivers connected to the respective physical lines; and a control unit configured to start, when protection switching for switching a transceiver used for communication among the transceivers from a working transceiver to a backup transceiver is performed, communication via the backup transceiver using a link identifier used in the working transceiver and the physical line of the working transceiver and transmit a message for instructing end of a holdover state to the user-side communication apparatus that has shifted from a registered state to the holdover state.

A control device for a user-side optical line terminal apparatus that communicates with a station-side optical line terminal apparatus via a splitter that divides an optical signal, the station-side optical line terminal apparatus and the splitter being connected by a plurality of redundant physical lines according to still further aspect of the present invention is configured in such a manner that the control device monitors a timestamp drift error that is generated when a difference between a timestamp included in a received signal and a local time measured by the own apparatus is larger than a value set in advance and, when the timestamp drift error has occurred, shifts to the deregistered state and waits for registration by the discovery processing of the station-side optical line terminal apparatus and, on the other hand, when line abnormality of the physical lines is detected, suppresses a shift to the deregistered state due to occurrence of the timestamp drift error during the holdover period set in advance.

Advantageous Effects of Invention

The communication switching method, the communication apparatus, the station-side communication apparatus, the communication system, and the control unit according to the present invention can start communication resumption after line switching early.

DESCRIPTION OF EMBODIMENTS

First Embodiment

Figure 1:
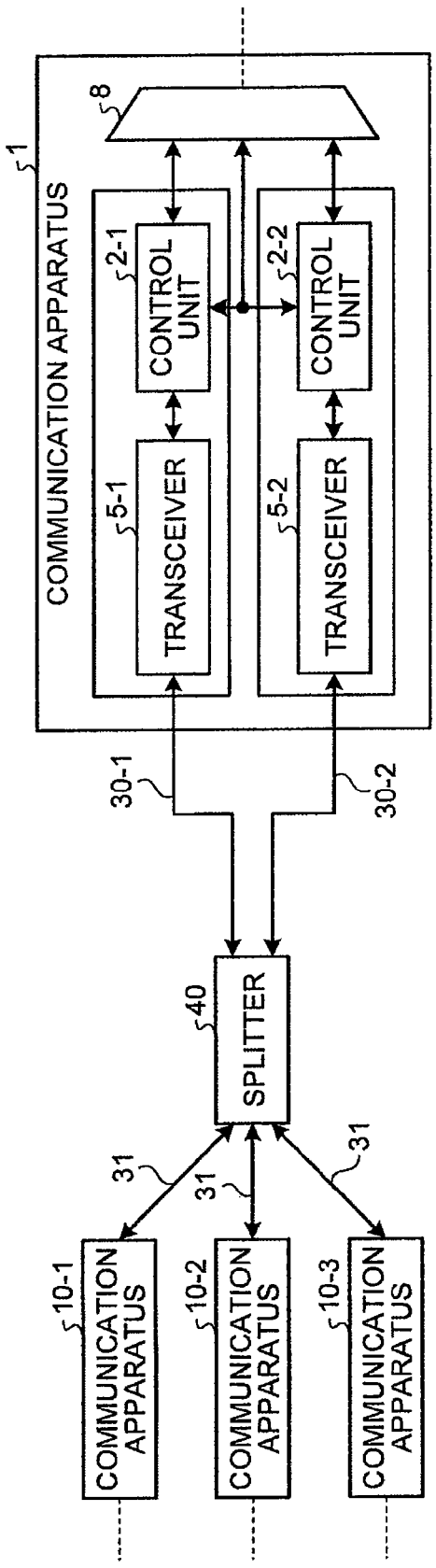
FIG. 1 is a configuration diagram of the configuration of a communication system in a first embodiment of the present invention.

FIG. 1 shows a communication system in which a plurality of communication apparatuses 10-1 to 10-3 (hereinafter referred to as slave station or slave station apparatus 10 when one slave station apparatus is not specified), which are slave stations, are connected to a communication apparatus 1, which is a master station. The communication apparatus 1 performs setting of a communication line to the slave station apparatuses 10 and controls communication with a plurality of the slave station apparatuses 10. The communication apparatus 1 and the slave station apparatus 10 are connected by redundant communication lines 30-1 and 30-2. In the communication system shown in FIG. 1, the communication apparatus 1 to a splitter 40 are made redundant. Such a redundant system is called TYPE-B protection system in a PON (Passive Optical Network) system. The splitter 40 divides signals in the lines 30-1 and 30-2 and transmits the signals to lines 31 and transmits signals in the lines 31 to the lines 30-1 and 30-2. The master-station communication apparatus 1 includes transceivers 5-1 and 5-2 for each of the lines 30-1 and 30-2 and performs transmission and reception of signals using the lines 30-1 and 30-2 according to the control by control units 2-1 and 2-2. The communication lines 30-1 and 30-2 are physical lines such as optical fibers having different physical paths. The physical lines can house a plurality of logical links.

A switching device 8 is a device that switches connection of the control units 2-1 and 2-2 to an external apparatus or a network according to switching signals from the control units 2-1 and 2-2. When the communication apparatus 1 does not relay a signal to the external apparatus and communication is completed in the communication apparatus 1, the switching device 8 is unnecessary.

The operation of the communication system is explained. The communication apparatus 1 designates one (a part) of the redundant lines 30-1 and 30-2, for example, the line 30-1 as a working communication line and performs communication with the communication apparatus 10. The remaining communication line is in a standby state or a standby state in preparation for failure occurrence as a backup communication line, for example, the line 30-2. The communication apparatus 1 monitors a failure of the lines 30 from a state of a received signal and switches a line used for transmission and reception from the working communication line 30-1 to the backup communication line 30-2 when a failure occurs. After the switching, the line 30-2 is used as a new working communication line.

Figure 2:
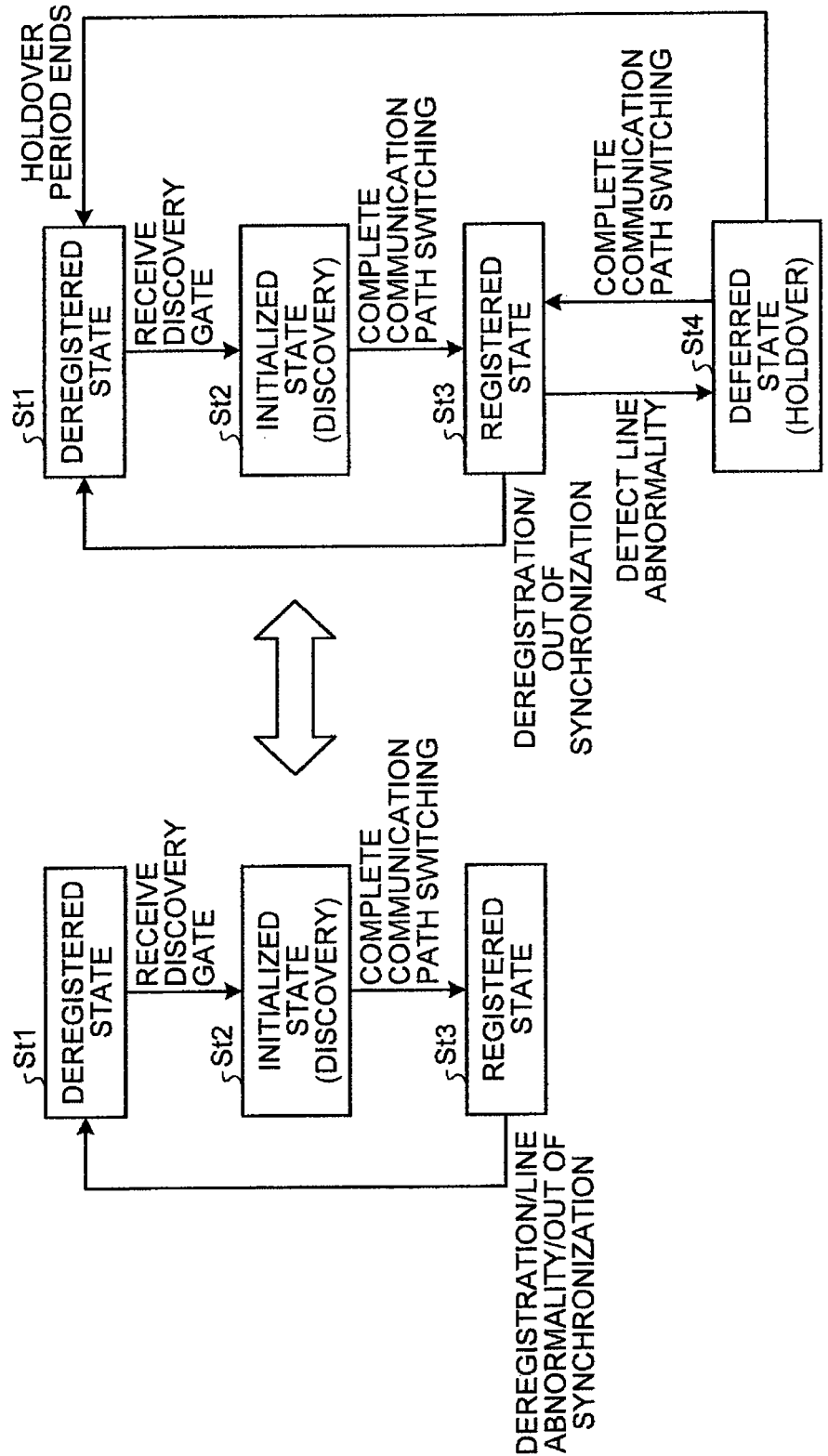
FIG. 2 is a state transition chart of state transitions of a communication terminal in the first embodiment of the present invention.

FIG. 2 shows state transitions of the slave station apparatus 10. A state transition shown on the left is a state transition in which switching of the communication lines 30 is not taken into account. A state transition shown on the right is a state transition in which a deferred state (a holdover state) of initialization is provided such that communication can be resumed at high speed when the communication lines 30 are switched.

Initial setting and return from line abnormality of the communication apparatus 10 are explained based on the state transition shown on the left in FIG. 2. When the communication apparatus 10 not connected yet is connected to the line 31 anew or when the communication apparatus 10 that has been off is turned on, line setting for communication with the communication apparatus 1 on the master station side is not set and the communication apparatus 10 is not registered in the communication apparatus 1. Therefore, the communication apparatus 10 cannot perform communication (state St1). This state is referred to as deregistered state. The communication apparatus 10 in the deregistered state performs only reception until the communication apparatus 10 is registered in the communication apparatus 1. The communication apparatus 10 stays in the standby state until communication is permitted by the communication apparatus 1 on the master station side.

When the communication apparatus 10 receives a control message (a discovery gate) for accepting new registration from the master station, the communication apparatus 10 shifts to a state St2 (a discovery state) for performing initial setting. In this state, the communication apparatus 10 transmits own identification information and, if necessary, ability information to the master station. The communication apparatus 10 is registered as a communication partner in the master station based on the information. After registering the communication apparatus 10, the master station transmits a control message for informing the registration to the communication apparatus 10. The control message includes setting information of a communication link. The communication apparatus 10 that receives the control message stores the setting information and shifts to a communicable state St3 by applying necessary communication setting to the own apparatus. This state is referred to as registered state. The communication apparatus 10 that shifts to the registration state thereafter performs transmission and reception of data to and from the master station using the setting information.

The communication apparatus 10 in the registered state always/intermittently monitors a state of a received signal. For example, when a signal cannot be received for a predetermined period, the communication apparatus 10 determines that line abnormality has occurred and generates warning information. The communication apparatus 10 that has detected the line abnormality discards the setting information, disconnects the communication link, returns to the deregistered state St1, and stays on standby until a communication line is set from the master station.

Figure 3:
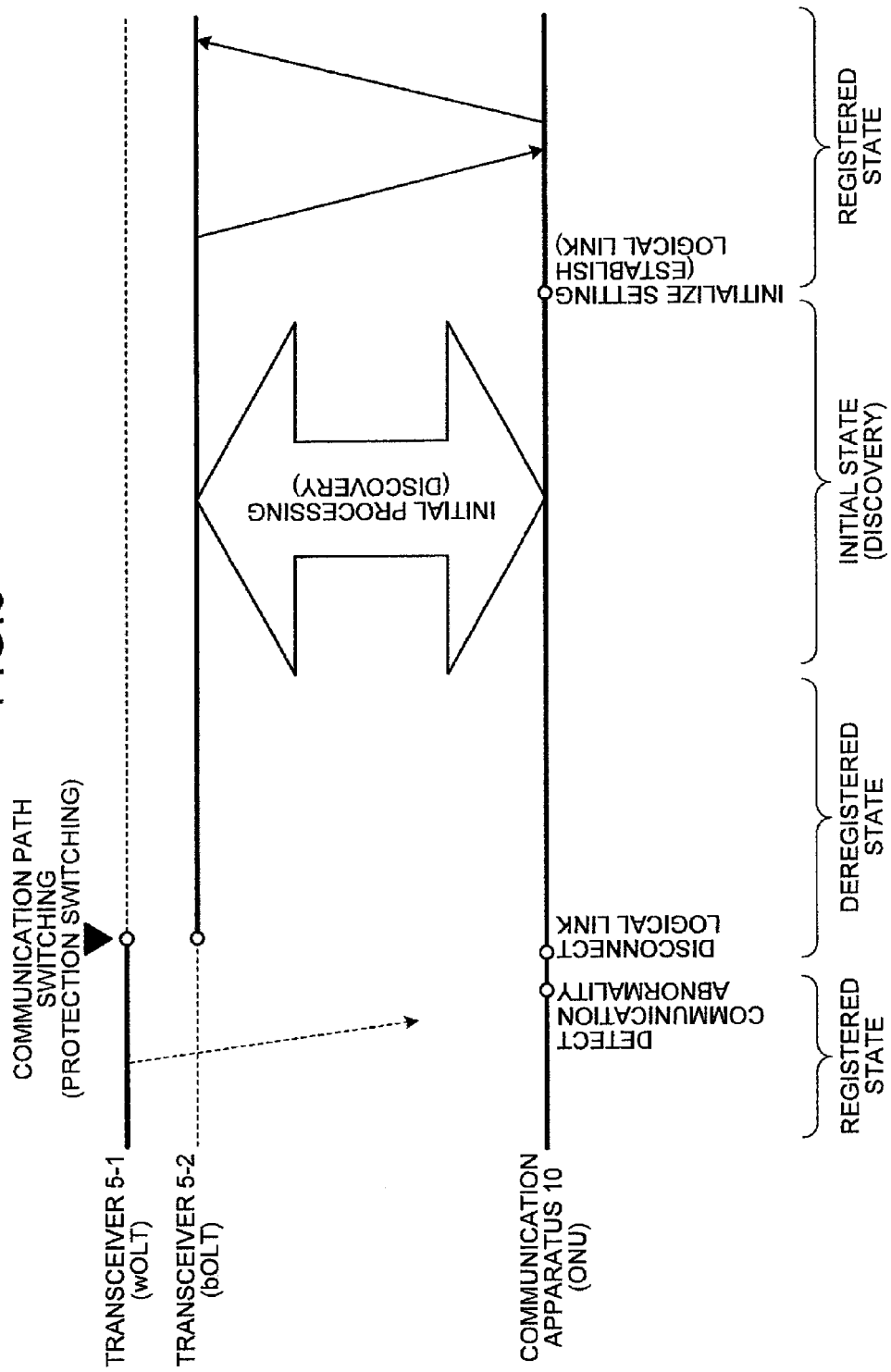
FIG. 3 is a sequence chart of switching processing for a communication line.

When the communication apparatus 10 that executes this process is connected to the protection system in which the communication lines 30 are made redundant shown in FIG. 1, the communication apparatus 10 performs communication shown in a sequence chart of FIG. 3. Time until recovery of communication after failure occurrence is long. It is assumed that, when the transceiver 5-1 of the master station operates as a working transceiver and the transceiver 5-2 is in the standby state as a backup transceiver, a communication state of the working transceiver is unstable and a downstream signal does not normally reach the communication apparatus 10. At this point, the master station switches a communication line used for communication (protection switching) and starts communication using the backup communication path 30-2 as a working communication line anew. On the other hand, when line abnormality occurs, for example, the downstream signal does not reach the communication apparatus 10 on the slave station side, regardless of the protection switching performed by the master station, the communication apparatus 10 on the slave station side disconnects the communication link and returns to the deregistered state. The communication apparatus 10 returns to the registered state and resumes communication through resetting of a link by initial processing (discovery processing). Therefore, time in which communication is suspended is long.

Therefore, as in the state transition shown on the right in FIG. 2, a deferred state St4 (a holdover state) for deferring initial setting when line abnormality occurs is provided. Consequently, the suspension time of communication during the protection switching can be reduced. When the communication apparatus 10 in the registered state St3 detects line abnormality, the communication apparatus 10 does not directly shift to the deregistered state St1. The communication apparatus 10 maintains the setting information without disconnecting the communication link during the deferred period and continues reception until a normal signal from the master station arrives. When the communication line is normally switched within a deferred period (a holdover period), the communication apparatus 10 returns to the registered state St3 without disconnecting the communication link. Therefore, the suspension time of communication can be reduced compared with the suspension time in the resumption of communication through the deregistered state St1 and the state St2 (the discovery state) for performing the initial setting.

Figure 4:
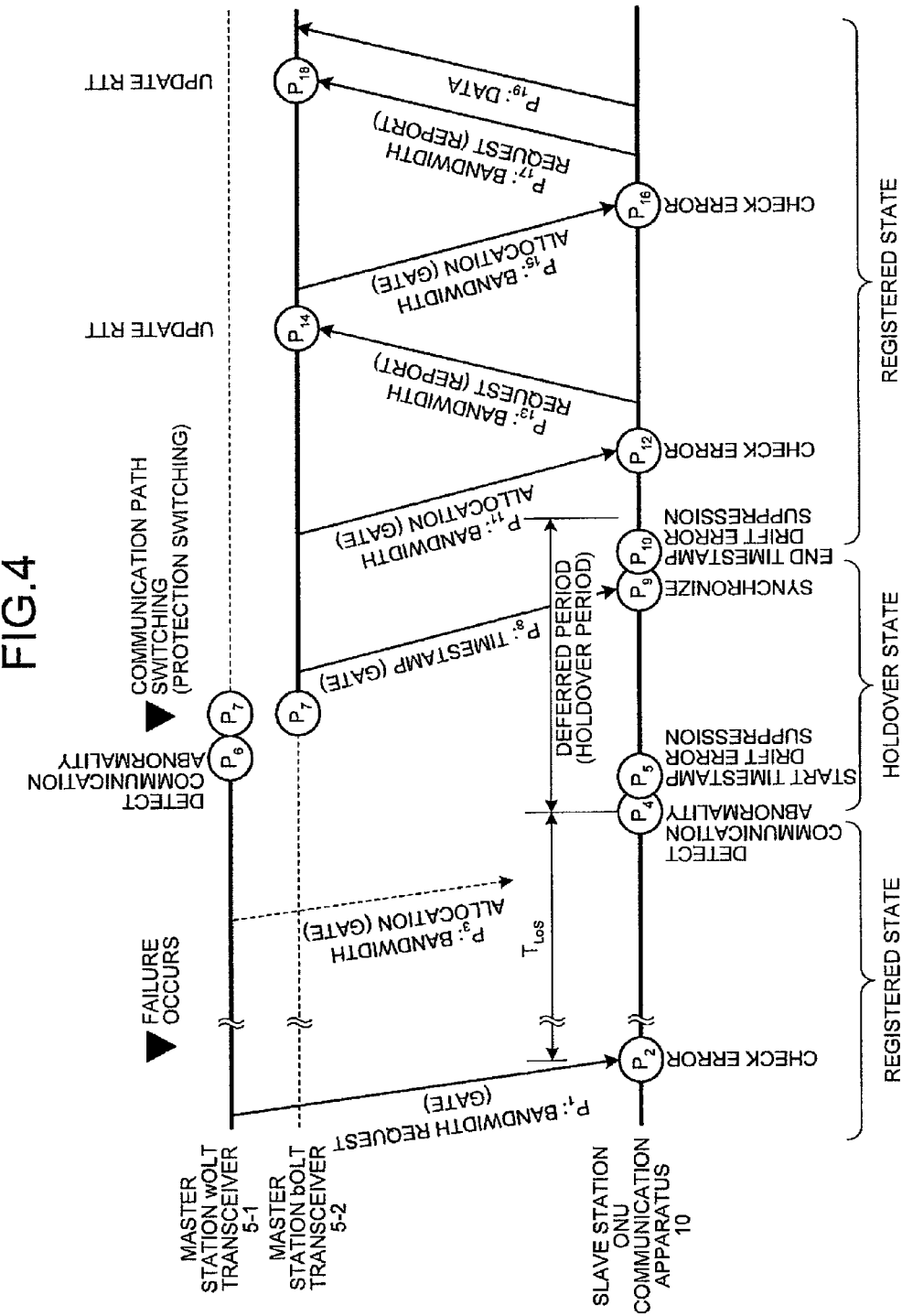
FIG. 4 is a sequence chart of a switching method of a communication line in a first embodiment of the present invention.

A communication sequence in which the deferred state St4 is used is explained with reference to FIG. 4. It is seen that, when communication path switching occurs, the communication apparatus 10 can return to the registered state early not through the deregistered state and the initial state by using the communication sequence shown in FIG. 4 compared with the communication sequence shown in FIG. 3.

The transceiver 5-1 of the master station, which is the working transceiver, designates, in bandwidth allocation information, a transmission bandwidth that the communication apparatuses 10 can use for upstream communication and regularly or irregularly repeatedly notifies the transmission bandwidth using a control message ($P_1$, $P_{11}$, and $P_{15}$). The communication apparatus 10 performs upstream transmission using the notified transmission bandwidth. When the communication apparatus 10 receives the control message, the communication apparatus 10 checks the control message and detects whether there is abnormality in downstream communication ($P_2$). Error detection includes (a) detection for checking whether abnormal data is included in a received signal and (b) detection for determining that communication interruption has occurred when a downstream signal is not received for a period equal to or longer than a predetermined period and checking an error.

An example of the detection (a) is out-of-synchronization detection (timestamp drift error). The master station transmits time information (timestamp) serving as a reference for transmission timing to the communication apparatuses 10 and performs control for synchronizing reference times of the communication apparatuses 10. The communication apparatuses 10 adjust times of the own apparatuses to the received time information. However, when a difference between the received time information and time (local time) information measured by the own apparatuses is equal to or larger than a predetermined threshold, the communication apparatuses 10 determine that abnormality has occurred in a downstream signal and detect an error of out of synchronization.

An example of the detection (b) is LOS (Loss of Signal) detection. When the communication apparatus 10 does not receive a downstream signal for a predetermined period $T_{LOS}$, the communication apparatus 10 detects a LOS. The communication apparatus 10 includes a timer or a counter and resets the timer or the like every time the communication apparatus 10 receives a message. When a value of the timer or the like has exceeded the predetermined time $T_{LOS}$, the communication apparatus 10 detects a LOS.

When a downstream signal from the transceiver 5-1 of the master station does not normally reach the communication apparatus 10 (P3) and the communication apparatus 10 detects line abnormality (P4), the communication apparatus 10 suppresses an output of an out-of-synchronization error (a timestamp drift error) (P5). In other words, the communication apparatus 10 does not detect an out-of-synchronization error or, even if an out-of-synchronization error is detected, performs control not to shift to the deregistered state St1. At this point, the communication apparatus 10 shifts to the deferred period and starts measurement of the deferred period by the timer or the counter to measure the deferred period. The salve station in the deferred state continues reception of a downstream signal. On the other hand, to avoid a signal loss during line switching and overlap of transmission with the other slave stations, the slave station stops transmission of an upstream signal. By stopping the transmission of the upstream signal, the slave station can also inform the master station that abnormality has occurred and urge the master station to perform line switching.

This implicit notification of the slave station is effective as abnormality notification when a line failure is likely to occur. This is because, when the lines 30 are disconnected, in explicit abnormality notification by transmission of an abnormality signal, the slave station can notify only the backup communication apparatus.

The suppression of output of an out-of-synchronization error by the slave station in the deferred state brings about an effect of early communication resumption. As explained later, when the communication line is switched, an out-of-synchronization error tends to occur because a communication distance is likely to change. When pieces of time information do not coincide with each other between the control units 2-1 and 2-2 on the master station side, this non-coincidence causes an out-of-synchronization error on the slave station side. When the out-of-synchronization error occurs, the salve station returns to the deregistered state St1 to re-establish a communication link. Therefore, a communication suspension period after the communication line switching is long. The suppression of an out-of-synchronization error suppresses such a long suspension period and realizes early communication resumption.

On the other hand, the master station observes a state of the communication line 30-1 such as a state in which a signal from the slave station does not normally reach and detects line abnormality ($P_6$). The control unit 2-1 of the master station that has detected abnormality performs switching processing for the communication line ($P_7$). The control unit 2-1 transmits a line switching signal to the backup control unit 2-2 and the switching device 8 and passes setting information of the slave stations to the backup control unit 2-2. The control unit 2-1 stops transmission through the line 30-1 and thereafter operates as a backup control unit. The backup control unit 2-2 that has received the line switching signal starts the operation of a working control unit. First, to synchronize the slave stations, the control unit 2-2 transmits a synchronization signal having time information (timestamp) to the slave stations in the deferred state. The synchronization signal can be either a unicast message or a multicast message.

When the slave station receives the synchronization signal, the slave station synchronizes the timer or the counter of the own apparatus with the time information included in the synchronization signal ($P_9$) and shifts from the deferred state St4 to the registered state St3. At this point, the slave station releases the suppression of output of an out-of-synchronization error (a timestamp drift error) and resumes normal error detection ($P_{10}$). The measurement of the deferred period is suspended at the end of the deferred state.

The master station transmits a control message (GATE) including bandwidth allocation information to the slave stations ($P_{11}$). The slave station receives the message and, as in (P2) explained above, checks an error including out-of-synchronization and transmits a message (REPORT) including bandwidth request information using an allocated bandwidth ($P_n$).

Subsequently, when the master station receives the bandwidth request, the master station updates RTT (Round Trip Time) for the slave stations ($P_{14}$ and $P_{18}$). The RTT can be measured according to transmission time of a control message of bandwidth allocation ($P_{11}$) and reception time of a response message to the message (bandwidth request: $P_{13}$). Because communication distances between the slave stations and the master station are not always the same, transmission times of upstream signals reaching the master station are different. Therefore, the master station determines bandwidths allocated to the slave stations taking into account the RTT and the bandwidth request such that signals transmitted from the slave stations do not overlap when being received by the master station ($P_{15}$). The slave station transmits a new bandwidth request and data based on the allocated bandwidth ($P_{17}$ and $P_{19}$).

After the detection of the line abnormality (P4), when the slave station in the deferred state St4 does not normally receive a downstream signal after the line switching during the deferred period, i.e., when the elapse of the deferred period is detected by the timer or the counter that measures the deferred period, the slave station ends the deferred state St4 and shifts to the deregistered state St1 to reset a communication link. When the communication link is reset, the setting information before the line switching is discarded and rewritten to new setting information.

As explained above, with the communication system according to this embodiment, it is possible to provide the deferred state and maintain the communication link during the line switching. Therefore, it is possible to perform communication resumption after the line switching early. Because the slave station suppresses an out-of-synchronization error during the deferred period, the slave station rarely returns to the deregistered state after the line switching. Therefore, it is possible to effectively realize early resumption of communication.

Application Example to an IEEE802.3 Communication System

Figure 5:
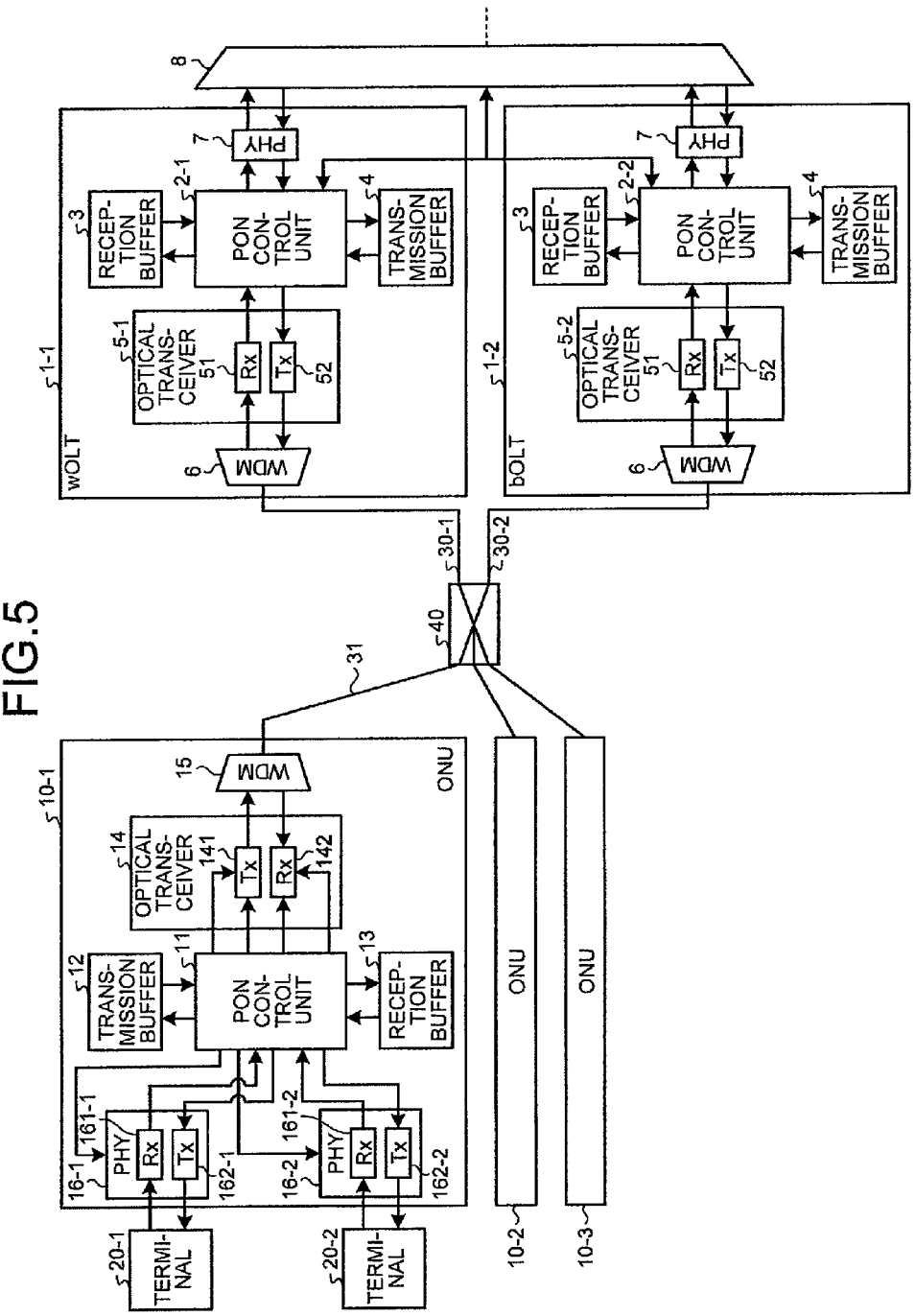
FIG. 5 is a configuration diagram of an example of a communication system in the first embodiment of the present invention.

An example in which the first embodiment is applied to an optical communication system employing a communication protocol of IEEE802.3 is explained. FIG. 5 is a diagram of a PON system of the application example. In FIG. 5, reference numerals and signs same as those in FIG. 1 represent the same or equivalent components. A master station is configured by a working wOLT (Working Optical Line Terminal) and a backup bOLT (Backup Optical Line Terminal). A wOLT 1-1 and a bOLT 1-2 (hereinafter referred to as OLTs 1 when the wOLT 1-1 and the bOLT 1-2 are not distinguished) and ONUs 10-1 to 10-3 are connected by subscriber lines 30-1 and 30-2 via the splitter 40. The splitter 40 is a passive device that divides the subscriber lines 30-1 and 30-2 connected to the OLT 1 into the number of the ONUs 10-1 to 10-3. The ONU 10-1, which is a communication apparatus of a slave station, is connected to terminals 20-1 and 20-2. In the example explained herein, three ONUs are provided. However, the number of ONUs is not limited to this and can be any number.

The OLTs 1 include PON control units 2-1 and 2-2 (hereinafter referred to as PON control units 2) that carry out processing on an OLT side based on a PON protocol, reception buffers 3, which are buffers for storing upstream data received from the ONUs 10-1 to 10-3, transmission buffers 4, which are buffers for storing downstream data transmitted to the ONUs 10-1 to 10-3, optical transceivers 5-1 and 5-2 that perform transmission and reception processing for an optical signal, WDM (Wavelength Division Multiplexing) couplers (WDMs) 6 that wavelength-multiplex the upstream data and the downstream data, and physical layer processing units (PHYs) 7 that realize a physical interface function of an NNI (Network Node Interface) between the OLTs 1 and a network. The optical transceivers 5-1 and 5-2 include optical receivers (Rxs) 51 that perform reception processing and optical transmitters (Txs) 52 that perform transmission processing.

The ONU 10-1 includes a PON control unit 11 that carries out processing on an ONU side based on the PON protocol, a transmission buffer (an upstream buffer) 12, which is a buffer for storing transmission data (upstream data) to the OLT 1, a reception buffer (a downstream buffer) 13, which is a buffer for storing reception data (downstream data) from the OLT 1, a WDM 15 that wavelength-multiplexes the upstream data and the downstream data, and physical layer processing units (PHYs) 16-1 and 16-2 that respectively realize a physical interface function of a UNI (User Network Interface) between the ONU 10-1 and terminals 20-1 and 20-2.

An optical transceiver 14 includes an optical transmitter (Tx) 141 that performs transmission processing and an optical receiver (Rx) 142 that performs reception processing. The PHY 16-1 is configured by a receiving unit (Rx: Receiver) 161-1 that performs reception processing and a transmitting unit (Tx: Transmitter) 162-1 that performs transmission processing. The PHY 16-2 includes a receiving unit (Rx: Receiver) 161-2 that performs reception processing and a transmitting unit (Tx: Transmitter) 162-2 that performs transmission processing.

The two terminals are connected to the ONU 10-1. However, the number of the terminals is not limited to this and can be any number. The ONU 10-1 includes physical layer processing units (PHYs) corresponding to the number of the terminals. In FIG. 5, the configuration example of the ONU 10-1 is representatively shown. However, the ONUs 10-2 and 10-3 have the same configuration as the ONU 10-1.

The PON control unit 2 of the OLT 1 performs, as specified in IEEE802.3, bandwidth allocation of upstream data to the ONUs 10-1 and 10-3 such that transmission time frames do not overlap. The PON control unit 2 prevents collision of transmission data of the ONUs 10-1 to 10-3.

For the bandwidth allocation, any method can be used. For example, Dynamic Bandwidth Allocation Algorithm described in 'Su-il Choi and Jae-doo, "HuhDynamic Bandwidth Allocation Algorithm for Multimedia Services over Ethernet (registered trademark) PONs", ETRI Journal, Volume 24, Number 6, December 2002 p. 465 to p. 466' can be used.

The overall operation of the OLT 1 and the ONUs 10-1 to 10-3 is explained. The PON control units 2-1 and 2-2 (hereinafter referred to as PON control units 2 when the PON control units 2-1 and 2-2 are not distinguished) store downstream data (downstream communication data) received from a network through the PHYs 7 in the transmission buffers 4. When data is transmitted from the OLTs 1, the PON control units 2 read out downstream data stored in the transmission buffers 4 and output the downstream data to the optical transceivers 5. The Txs 52 of the optical transceivers 5 output transmission data to the WDMs 6 as optical signals. The WDMs 6 apply wavelength multiplexing to optical signals output from the optical transceivers 5 and output the optical signals to the ONUs 10-1 to 10-3 through the subscriber lines 30-1 and 30-2 as downstream signals. When the PON control units 2 transmit a control message for transmission bandwidth allocation for transmitting an instruction for transmission permission, the PON control units 2 output generated control messages to the optical transceivers 5. Thereafter, the control messages are transmitted to the ONUs 10-1 to 10-3 in the same manner as the downstream data. In the PON system shown in FIG. 1, the WDMs 6 and 15 are used to perform the wavelength multiplexing. However, when communication is performed with a single wavelength, the WDMs 6 and 15 are not essential.

When the ONUs 10-1 to 10-3 receive a downstream signal from the wOLT, the WDMs 15 separate the downstream signal and outputs the downstream signal to the optical transceivers 14. The Rxs 142 of the optical transceivers 14 convert the downstream signal into downstream data of an electric signal and output the downstream data to the PON control units 11. The PON control units 11 store the downstream data output from the Rxs 142 of the optical transceivers 14 in the reception buffers 13. The PON control units 11 read out the downstream data stored in the reception buffers 13 and output the downstream data to both or one of the PHYs 16-1 and 16-2 according to destinations of the data. The PHYs 16-1 and 16-2 that receive the downstream data apply predetermined processing to the downstream data and transmit the downstream data to the terminals 20-1 and 20-2 to which the PHYs 16-1 and 16-2 are connected.

On the other hand, when upstream data is transmitted from the ONUs 10-1 to 10-3, the PON control units 11 store upstream data acquired from the terminals 20-1 and 20-2 through the PHYs 16-1 and 16-2 in the transmission buffers 12. The PON control units 11 read out the upstream data stored in the transmission buffers and output the upstream data to the optical transceivers 14 based on a transmission bandwidth given from the wOLT. The Txs 141 of the optical transceivers 14 convert the upstream data into an optical signal (an upstream signal) and transmit the optical signal to the OLTs 1 through the WDMs 15 and the subscriber lines 30.

The PON control unit 2 of the wOLT stores the upstream data received from the ONUs 10-1 to 10-3 through the subscriber line 30, the WDM 6, and the Rx 51 of the optical transceiver 5 in the reception buffer 3. The PON control unit 2 reads out the upstream data stored in the reception buffer 3 and outputs the upstream data to the network through the PHY 7.

In the ONUs 10-1 to 10-3, the PON control units 11 receive, through the WDMs 15 and the Rxs 142 of the optical transceivers 14, a control message transmitted from the wOLT. The PON control units 11 perform carry-out of operation based on an instruction of the control message, generation of a response to the control message, and the like.

The operation of the communication system shown in FIG. 5 is as explained above with reference to FIGS. 2 and 4. In IEEE803.2 (IEEE803.2-2008, IEEE803.2av), the state St2 for performing the initial setting in FIG. 2 is the discovery state. In this state, discovery processing is carried out using a discovery GATE and the like.

GATE is used as the control message for bandwidth allocation in FIG. 4 and REPORT is used as the bandwidth request message in FIG. 4. In the error check, as the LOS, any one of Optical Los and MAC LoS or both are detected. The Optical LoS is an error detected when a transceiver does not receive an optical signal for a fixed period $T_{LoS\_optical}$. A default of $T_{LoS\_optical}$ is 2 milliseconds. However, $T_{LoS\_optical}$ can be changed to a different value by using a control message between the OLT 1 and the ONU 10. The MAC (Media Access Control) LoS is an error detected when the transceiver does not receive GATE for a predetermined period $T_{LoS\_MAC}$. A default value of $T_{LoS\_MAC}$ is set to 50 milliseconds. Like $T_{LoS\_optical}$, a value of $T_{LoS\_MAC}$ can be changed by a control message.

Both the Optical LoS and the MAC LoS are warnings indicating abnormality of an optical line and are monitored and detected using a warning timer not only in the ONU 10 but also in the OLT 1. The communication system detects a timestamp drift effort as an out-of-synchronization error. This error is detected in each of the OLT 1 and the ONU 10 and is detected when a difference between a clock of the OLT 1 and a clock of the ONU 10 exceeds thresholds (guardThresholdONU and guardThresholdOLT). RTT is also taken into account in the detection in the OLT 1. The clocks to be compared are acquired from a timestamp included in a received MPCPDU (Multi-Point Control Protocol Data Unit).

Figure 6:
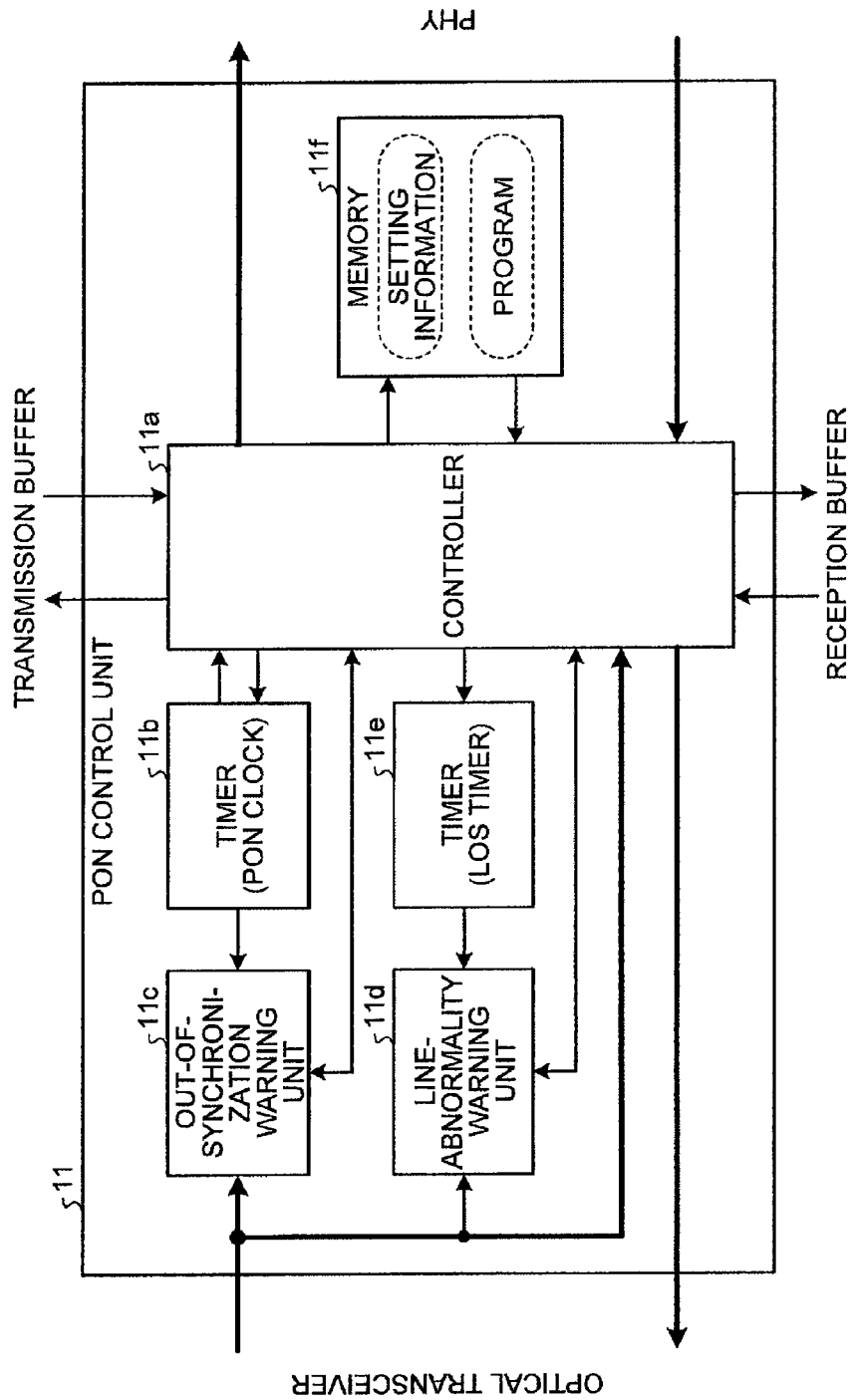
FIG. 6 is a configuration diagram of an example of a control unit in the first embodiment of the present invention.

FIG. 6 is a diagram of an example of the PON control unit 11 of the ONU. A controller 11*a* reads a command of a computer program stored in a memory 11*f*, performs input and output of a signal according to the command, and controls components of the PON control unit 11. A timer 11*b* measures a local time following a timestamp included in a received signal and supplies time information for discriminating transmission and reception timing to the controller 11*a*. An out-of-synchronization warning unit (a first warning unit) 11*c* compares the local time and the timestamp, monitors presence or absence of an out-of-synchronization error, and notifies the controller 11*a* of a warning.

A timer 11*e* is a timer that measures a reception interval of received signals. For example, the timer 11*e* measures reception time information of signals to detect the Optical LoS and the MAC LoS. A line-abnormality warning unit (a second warning unit) 11*d* monitors line abnormality based on the reception time information of the timer 11*e* and, when abnormality occurrence is detected, outputs a warning to the controller 11*a*. The Optical LoS can be detected by the optical transceiver 14. When abnormality occurs, a warning signal can be notified from the optical transceiver 14. The functions of the out-of-synchronization warning unit 11*c* and the line-abnormality warning unit 11*d* can be incorporated in the controller 11*a* as well.

Figure 7:
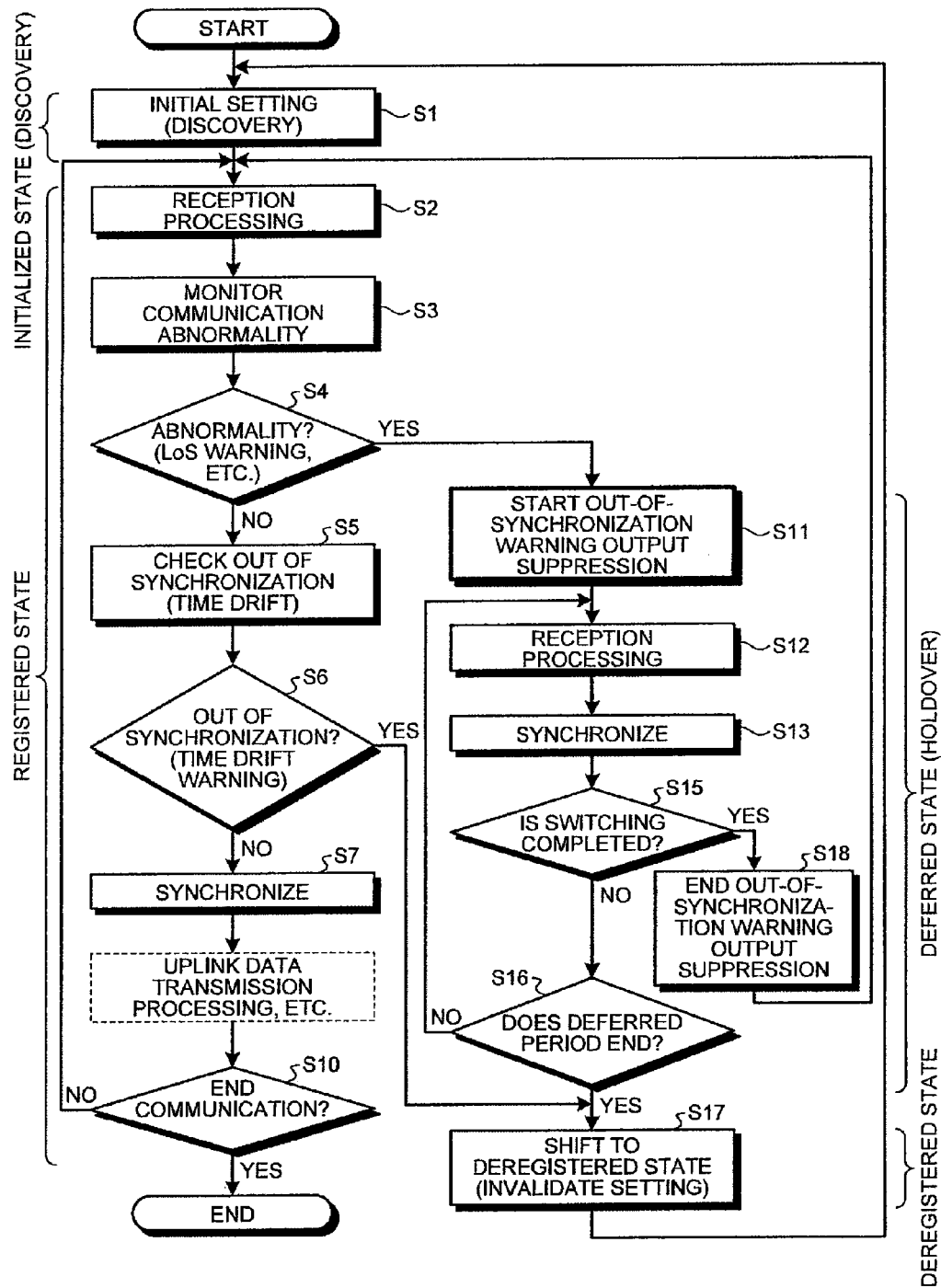
FIG. 7 is a flowchart for explaining processing by the control unit of the communication terminal in the first embodiment of the present invention.

The operation of the PON control unit 11 is explained as an example of the control unit with reference to FIG. 7. The PON control unit 11 is a control unit incorporated in a PON interface and is a processor formed as an IC chip (the same applies to the PON control unit 2). Processing described in FIG. 7 is stored in a memory internally or externally connected to a processor as a computer program executable by a computer.

First, the PON control unit 11 of the ONU 10 in the deregistered state performs the discovery processing (step S1). The PON control unit 11 refrains from transmission and continues reception processing until a transmission permission is given by a discovery GATE transmitted from the OLT 1. When the discovery GATE is received, the PON control unit 11 shifts to the discovery state and establishes a logical link between the ONU 10 and the OLT 1 by transmitting and receiving a control message. When setting information is acquired from the OLT 1 by the discovery processing, the PON control unit 11 stores the information. Thereafter, the PON control unit 11 can perform transmission and reception processing of a logical link based on the setting information. The PON control unit 11 shifts to the registered state.

The PON control unit 11 that has shifted to the registered state performs, based on the setting information, reception processing for receiving a control message and other downstream data from the OLT 1 (step S2). Subsequently, the PON control unit 11 performs LoS detection using the warning timer and checks whether there is abnormality in the optical line (e.g., whether disconnection of the line has occurred). When there is abnormality, the PON control unit 11 shifts to the holdover state (step S11).

When there is no abnormality, the PON control unit 11 extracts a timestamp included in a received signal and calculates a difference between the timestamp and time information indicated by the clock of the own apparatus to thereby check whether a timestamp drift error has occurred (steps S5 and S6). If the error has occurred, the PON control unit 11 shifts to the deregistered state to perform resetting of a line (step S17). If the error has not occurred, the PON control unit 11 synchronizes the own clock with the extracted timestamp (step S7) and transmits upstream data using a bandwidth allocated from the OLT 1 by GATE. In the GATE, start time for permitting transmission and length of the transmission are described as bandwidth allocation information as specified in GATE description of IEEE802.3. Further, the GATE has a plurality of kinds of bandwidth allocation information. A plurality of transmission bandwidths can be allocated to one ONU 10. Data transmission from the ONU 10 is performed according to the bandwidth allocation information and the setting information.

When communication is continued, the PON control unit 11 returns to step S2 and continues the communication in the registered state (step S10).

The setting information includes, for example, information concerning a logical link explained below.
(1) An LLID (Logical Link Identification), an Assigned Port LLID, or an Assigned Port is an identifier given to distinguish a plurality of logical links from one another and are added to a frame (data) transmitted using the logical links.
(2) Sync Time Sync Time indicates time in which a receiver is necessary for signal synchronization when the transceivers 5-1 and 5-2 of the OLT perform reception.
(3) Target Laser On Time
(4) Target Laser-off Time Target Laser On Time and Target Laser-off Time are time necessary for a laser of the transmitter of the ONU 10 to be turned on or off and is a value designated by the OLT taking into account transmitter characteristics reported from the ONU 10 in the discovery processing.

When LoS is detected at step S4, the PON control unit 11 shifts to the holdover state and starts suppression of output of an out-of-synchronization warning (a time drift error) and suppression of LoS detection by the warning timer. At the same time, the PON control unit 11 starts measurement of a holdover period, which is a deferred period (step S11). The suppression of the output of the time drift error can also be realized by simply not performing the out-of-synchronization check processing, which should originally be carried out as at step S5, after the reception processing. During the holdover period, the PON control unit 11 does not discard stored setting information and defers disconnection of a logical link.

Subsequently, the PON control unit 11 performs reception processing (step S12). Information received in the reception processing is GATE including a timestamp. Because data transmission is not performed in the holdover state, the PON control unit 11 does not return REPORT in response to the GATE. The GATE is transmitted for synchronizing the clock of the ONU 10. Therefore, a control message other than the GATE can be used instead of the GATE as long as the control message includes a timestamp.

The PON control unit 11 synchronizes the clock with the timestamp extracted from the GATE (step S13) and determines whether a line to be used is switched from a working line to a backup line (step S15). The PON control unit 11 regards switching is completed when effective GATE is received from the OLT, releases the suppression of the output of the out-of-synchronization warning (the time drift error) (step S18), and shifts to the registered state while maintaining the setting information (step S2). At this point, the PON control unit 11 suspends the measurement of the elapsed time of the holdover period. The PON control unit 11 resets the warning timer when ending the holdover state. Immediately after returning to the registered state, the PON control unit 11 performs resetting of time such that an unnecessary LOS warning is not emitted.

The PON control unit 11 that has returned to the registered state performs, using the setting information taken over from the state before the switching, communication in which a logical link is used. For example, in performing reception, the PON control unit 11 extracts Assigned Port (LLID) information of a received message, compares the information and setting information, and identifies a logical link addressed to the own apparatus. The PON control unit 11 can insert the taken-over Assigned Port information into a transmission message and use a logical link without resetting of the logical link.

The Sync Time and the Target Laser On/Off Time are used to determine a bandwidth in which data can be actually transmitted in an allocated bandwidth received from the OLT 1. In other words, the PON control unit 11 transmits actual data using a bandwidth obtained by subtracting the Sync Time and the Target Laser On/Off Time from the allocated bandwidth. Time is required, although a short time, from the time when a laser is controlled to be turned off until light is completely extinguished. When the transmitter of the ONU 10 continues the output of remaining light exceeding the Target Laser-off Time, transmission signals of the other ONUs 10 are hindered. Therefore, the OLT checks characteristics of the ONUs 10 in the discovery processing and notifies the ONU 10 of setting information related to the laser such that stable communication can be maintained without influencing the other ONUs 10. The PON control unit 11 that has succeeded in preventing discarding of setting information according to the holdover state determines a transmission bandwidth and transmits data using the maintained Target Laser On/Off Time.

When the Sync Time is inappropriate, a problem occurs in bit synchronization during reception of the OLT 1 and data cannot be normally reproduced. Therefore, the PON control unit 11 of the ONU secures a signal necessary for the synchronization and outputs a transmission signal taking into account the Sync Time.

Time is required for such discovery processing including negotiation of setting information because messages are exchanged many times between the ONU 10 and the OLT 1. In the PON control unit 11 of this application example, a synchronization program after switching of a physical line can be adjusted by the holdover state and resetting of the setting information can be omitted.

On the other hand, when the switching is not completed, the PON control unit 11 checks whether the holdover period has expired. If the holdover period has not expired, the PON control unit 11 returns to step S12 and continues the reception processing. When there is no reception data, the processing at steps S12 and S13 is not executed. The PON control unit 11 shifts to the next step S15 and receives a signal or repeats the same processing until the holdover period expires.

If the holdover period has expired, the PON control unit 11 determines that the switching has not been normally performed or a failure due to another cause has occurred. The PON control unit 11 shifts to the deregistered state (step S17). When the PON control unit 11 shifts to the deregistered state, the logical link is disconnected and the setting information is discarded and invalidated.

The application example of the embodiment to the communication system employing the communication protocol specified in IEEE803.2 is explained above. In IEEE803.2, discovery is performed at a predetermined interval but is not always carried out in every period. Therefore, when the ONU 10 shifts to the deregistered state at the time of the switching of the communication lines 30, the ONU 10 cannot resume suspended communication until the discovery processing is completed. On the other hand, according to this application example, it is possible to effectively realize early resumption of communication as explained above.

Second Embodiment

An embodiment in which resistance against instability during line switching can be improved and early resumption of communication can be more surely realized is explained using an application example to IEEE803.2.

Figure 8:
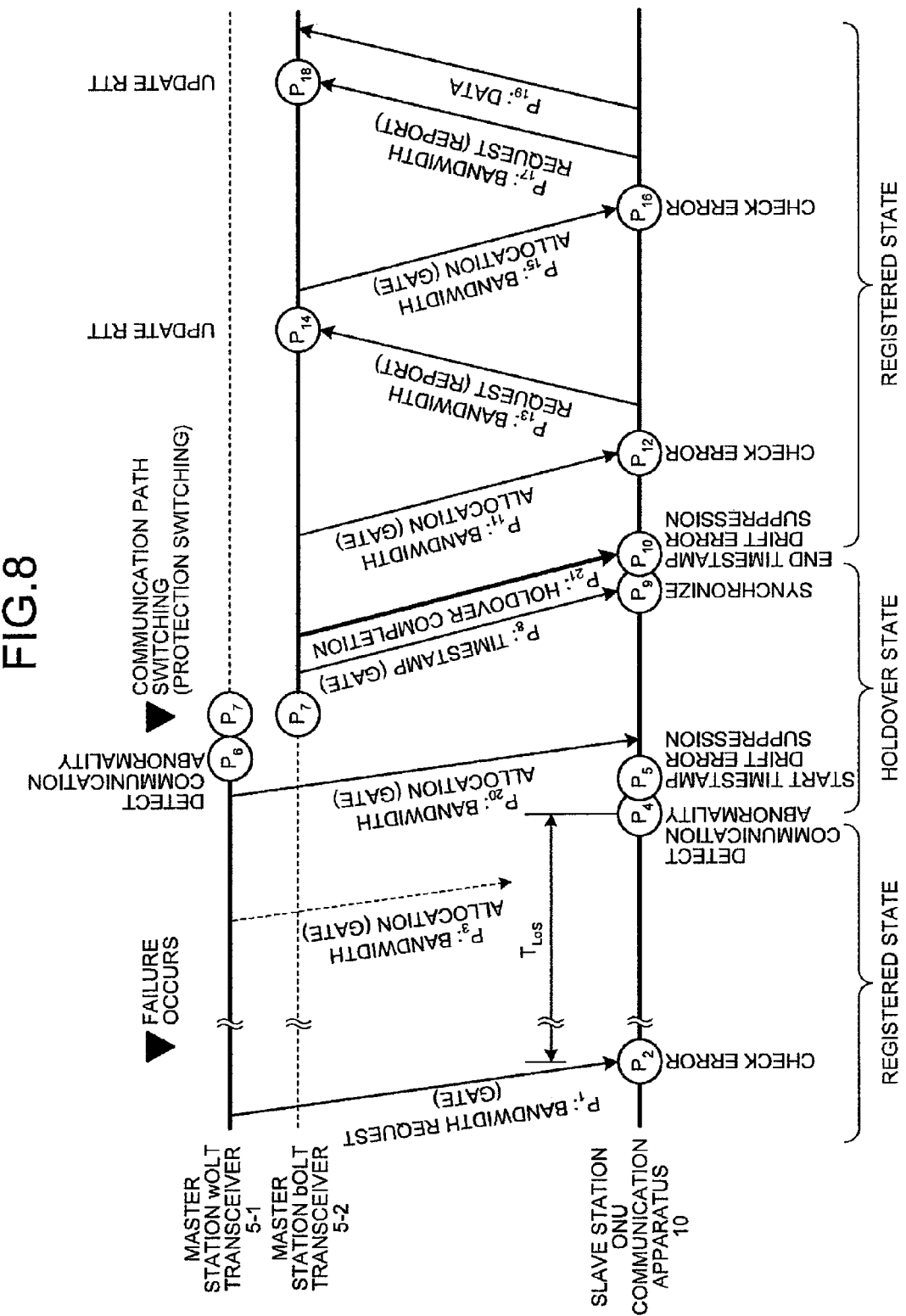
FIG. 8 is a sequence chart of a switching method for a communication line in a second embodiment of the present invention.

FIG. 8 shows a communication sequence of a communication system according to this embodiment. In FIG. 8, reference numerals and signs same as those in FIG. 4 represent the same or equivalent sections. When a communication failure occurs in a working communication line, communication becomes unstable and a downstream signal reaches or does not reach the ONU 10. Failure detection timing of the ONU 10 and failure detection timing of the OLT 1 do not always coincide with each other. Therefore, in the ONU 10 in the holdover state, GATE from the wOLT before switching is likely to arrive.

In the communication sequence shown in FIG. 4, when the ONU 10 in the holdover state receives GATE (P9), the ONU 10 shifts from the holdover state to the registered state (P10). However, when GATE transmitted by the wOLT before switching arrives at the ONU 10 in the holdover state as explained above (see P20 in FIG. 8), in the communication sequence shown in FIG. 4, the ONU 10 returns to the registered state. Therefore, if the ONU 10 receives GATE transmitted by the OLT after line switching, the ONU 10 detects a timestamp drift error.

Therefore, in the communication sequence shown in FIG. 8, even if the ONU 10 receives GATE from the wOLT before switching during the holdover period, the ONU 10 maintains the holdover state until the ONU 10 receives a holdover completion message (P21) (P10).

When the ONU 10 detects line abnormality (P4), the ONU 10 shifts to the holdover state (P5). At this point, if the wOLT has not detected line abnormality, the wOLT transmits GATE (P20). When the ONU 10 receives the GATE, the ONU 10 identifies a type of a control message and maintains the holdover state. On the other hand, an upstream signal from the ONU 10 to the wOLT stops and the wOLT detects line abnormality such as LOS ($P_6$) and performs switching of a communication line ($P_7$). When the switching is completed, the bOLT 5-2 starts communication control functioning as a new wOLT and transmits GATE including a timestamp ($P_8$). Subsequently, the OLT 5-2 transmits a control message and instructs the ONU 10 to complete the holdover state ($P_{21}$). The transmission of the control message (an instruction message) can be multicast transmission performed using an extended MPCP (Multi-Point Control Protocol) message addressed to a plurality of the ONUs 10 or can be unicast transmission performed using extended OAM (Operation Administration and Maintenance) messages addressed to the ONUs 10.

The ONU 10 performs synchronization processing based on the GATE (P9). When the ONU 10 receives a control message for holdover completion (Holdover_complete), the ONU 10 identifies a type of the message and ends the holdover state. Based on the sequence, even if the ONU 10 receives GATE from the OLT immediately after switching as second GATE, because a timestamp drift error is effectively suppressed, the ONU 10 can maintain the logical link and resume communication early.

Figure 9:
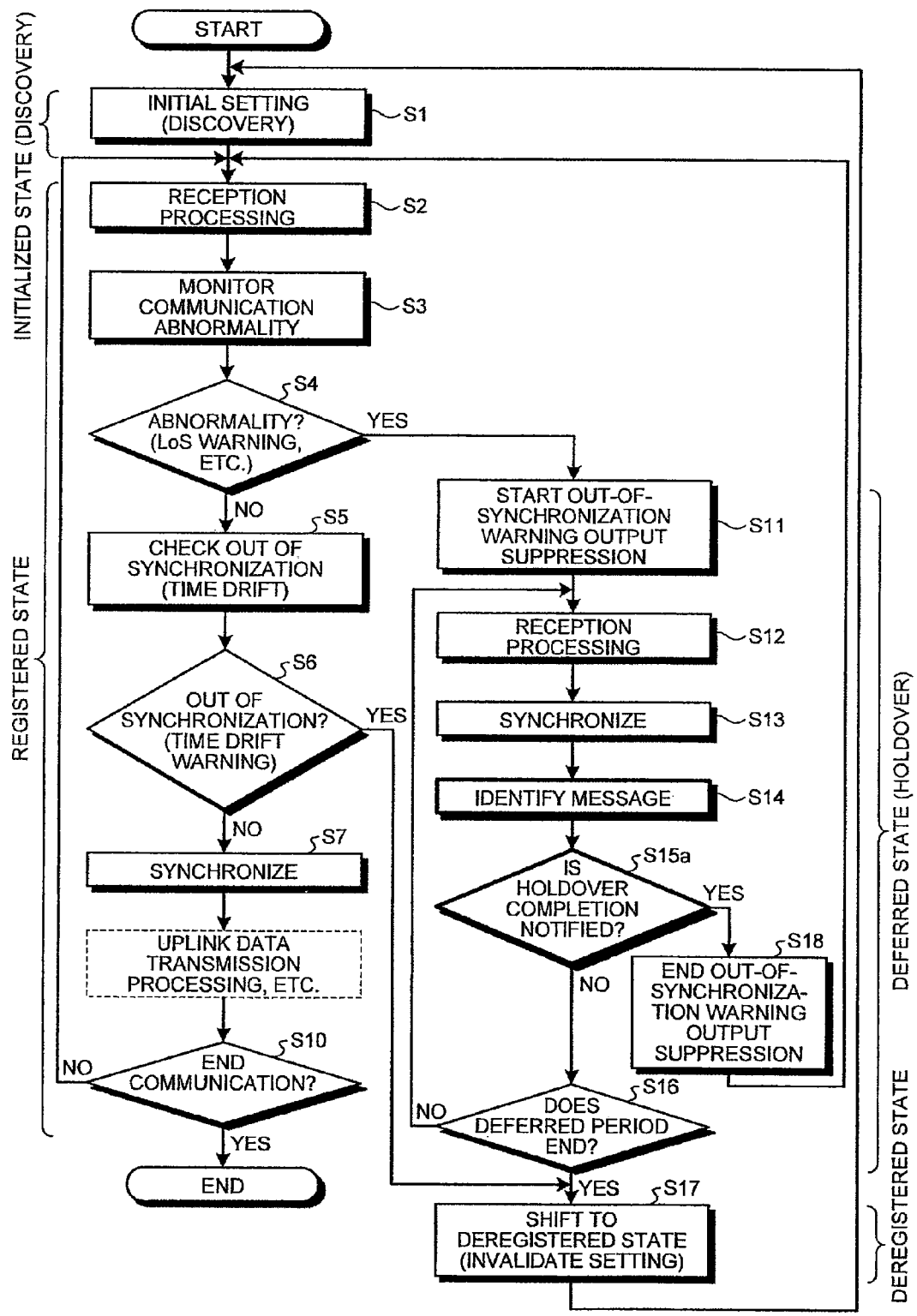
FIG. 9 is a flowchart for explaining processing by a control unit of a communication terminal in the second embodiment of the present invention.

FIG. 9 shows control executed by the PON control unit 11. Reference signs same as those in FIG. 7 represent the same or equivalent processing. In the holdover state, at step S14, the PON control unit 11 extracts type information of a control message from the control message and identifies the type of the control message. When the type is holdover completion, the PON control unit 11 shifts to processing at step S18 and returns to the registered state (step S15a). On the other hand, when the type is not the holdover completion, the PON control unit 11 shifts to processing at step S16 and continues the holdover state.

Third Embodiment

An embodiment in which time required for line switching can be reduced by shifting to the deferred state (the holdover state) early is explained using an application example to IEEE803.2.

Figure 10:
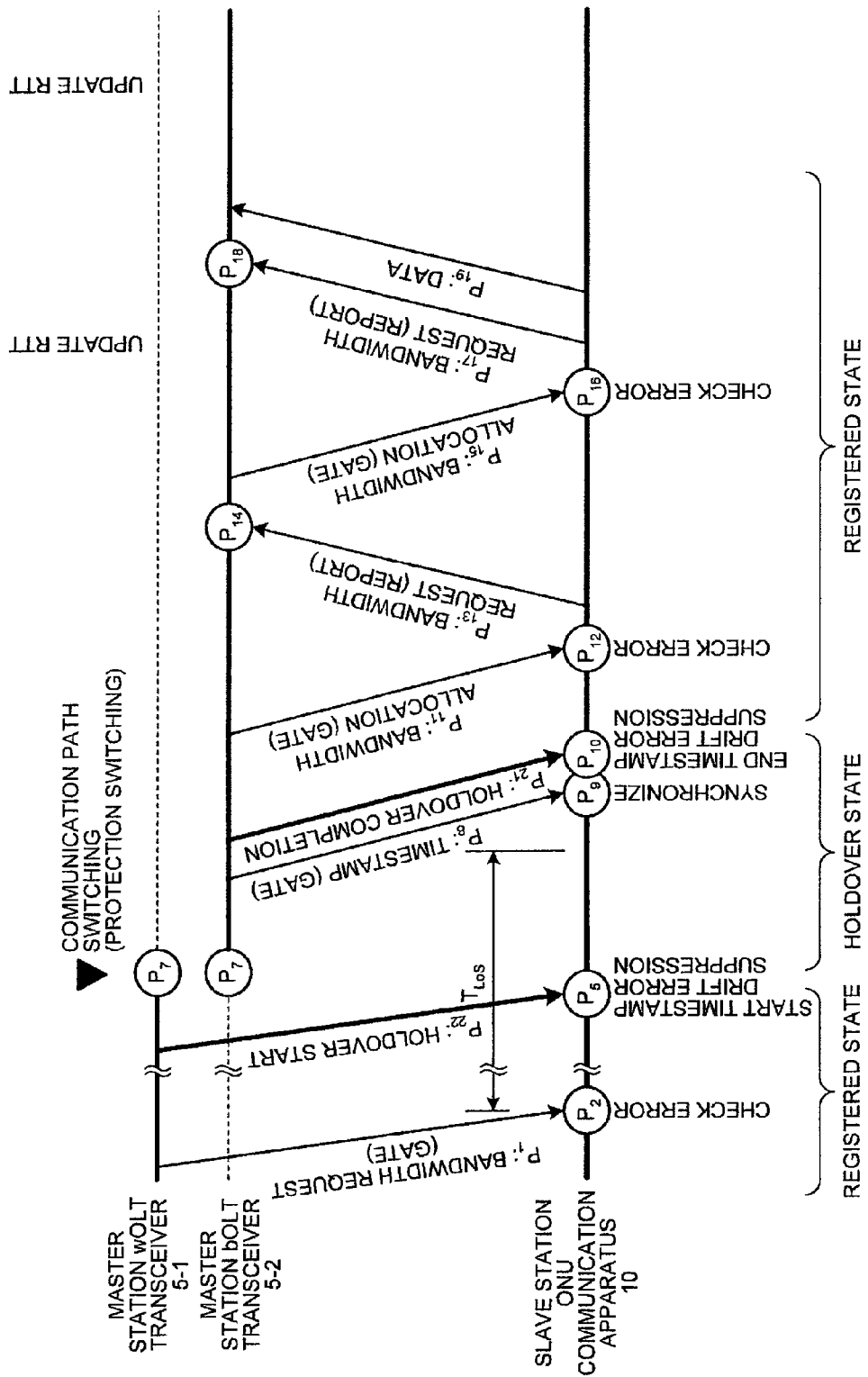
FIG. 10 is a sequence chart of a switching method for a communication line in a third embodiment of the present invention.

FIG. 10 shows a communication sequence of this embodiment. Reference numerals and signs same as those in FIG. 8 represent the same or equivalent sections. In this embodiment, in a redundant protection system, it is sometimes desired to quickly perform line switching processing for maintenance of a working apparatus. For example, it is desired to replace a PON interface substrate mounted with the transceivers 5-1 and 5-2 and the PON control units 2-1 and 2-2. In the communication system explained above, the ONU 10 can detect line abnormality by shutting down the working PON interface. Therefore, the ONU 10 can resume communication making use of the holdover state. However, the ONU 10 does not shift to the holdover state, for example, until the fixed time $T_{LoS}$ elapses from interruption of a downstream signal to LOS detection. Therefore, a fixed time is necessary before switching is completed.

Therefore, when the PON control unit 2-1 of the wOLT receives an instruction signal input by a user, in order to forcibly shift the ONU 10 to the holdover state, the PON control unit 2-1 transmits a control message for instructing holdover start (Holdover start) to the ONUs 10 (P22) The transmission of the control message (a shift message) can be multicast transmission performed using an extended MPCP (Multi-Point Control Protocol) message addressed to a plurality of the ONUs 10 or can be unicast transmission performed using extended OAM (Operation Administration and Maintenance) messages addressed to the ONUs 10. When the ONU 10 receives the control message, the ONU 10 shifts to the holdover state even if the ONU 10 does not detect line abnormality ($P_5$). When FIGS. 8 and 10 are compared, it is seen that, while the ONU 10 shifts to the holdover state after the elapse of the fixed period $T_{LoS}$ in FIG. 8, the ONU 10 can shift to the holdover state early before the fixed period $T_{LoS}$ elapses in FIG. 10.

The bOLT also can start the operation of a working OLT early by receiving notification from the wOLT or an instruction signal input by the user without waiting for detection of line abnormality. Therefore, switching processing can be completed in a short time. The transmission of the instruction signal is performed by the working transceiver 5-1. This notification method has an effect of preventing a timestamp drift error from occurring in the ONU 10 and preventing a suspension time from increasing.

Figure 11:
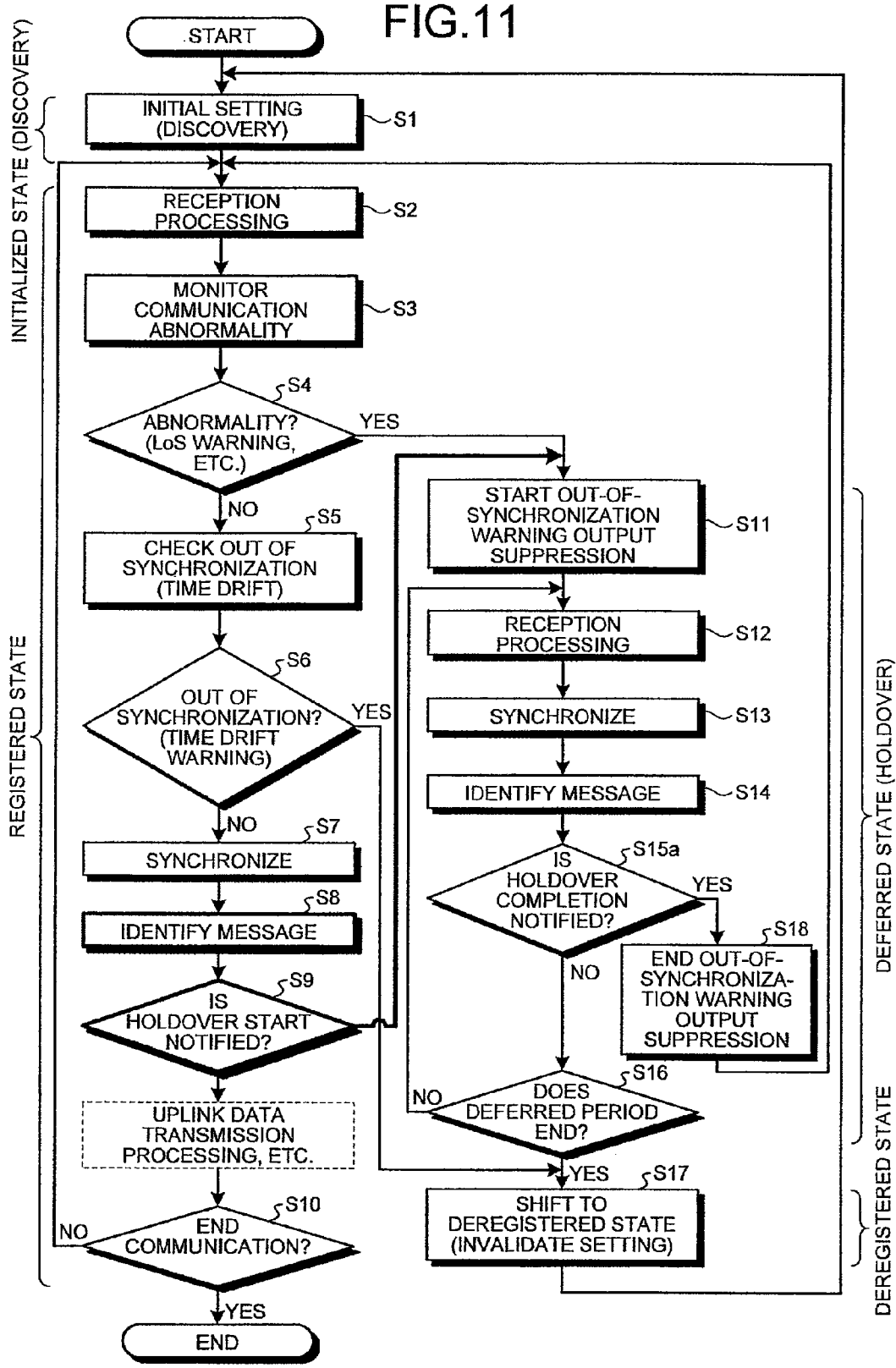
FIG. 11 is a flowchart for explaining processing by a control unit of a communication terminal in the third embodiment of the present invention.

FIG. 11 is a flowchart for explaining processing of the PON control unit 11 of the ONU 10. Reference signs same as those in FIG. 9 represent the same or equivalent processing. In the registered state, the PON control unit 11 extracts type information from a received control message and identifies a type of the message (step S8). When the identified type is holdover start (step S9), the PON control unit 11 starts processing at step S11 and shifts to the holdover state. On the other hand, when the type is not the holdover start, the PON control unit 11 maintains the registered state and continues processing such as transmission.

Figure 12:
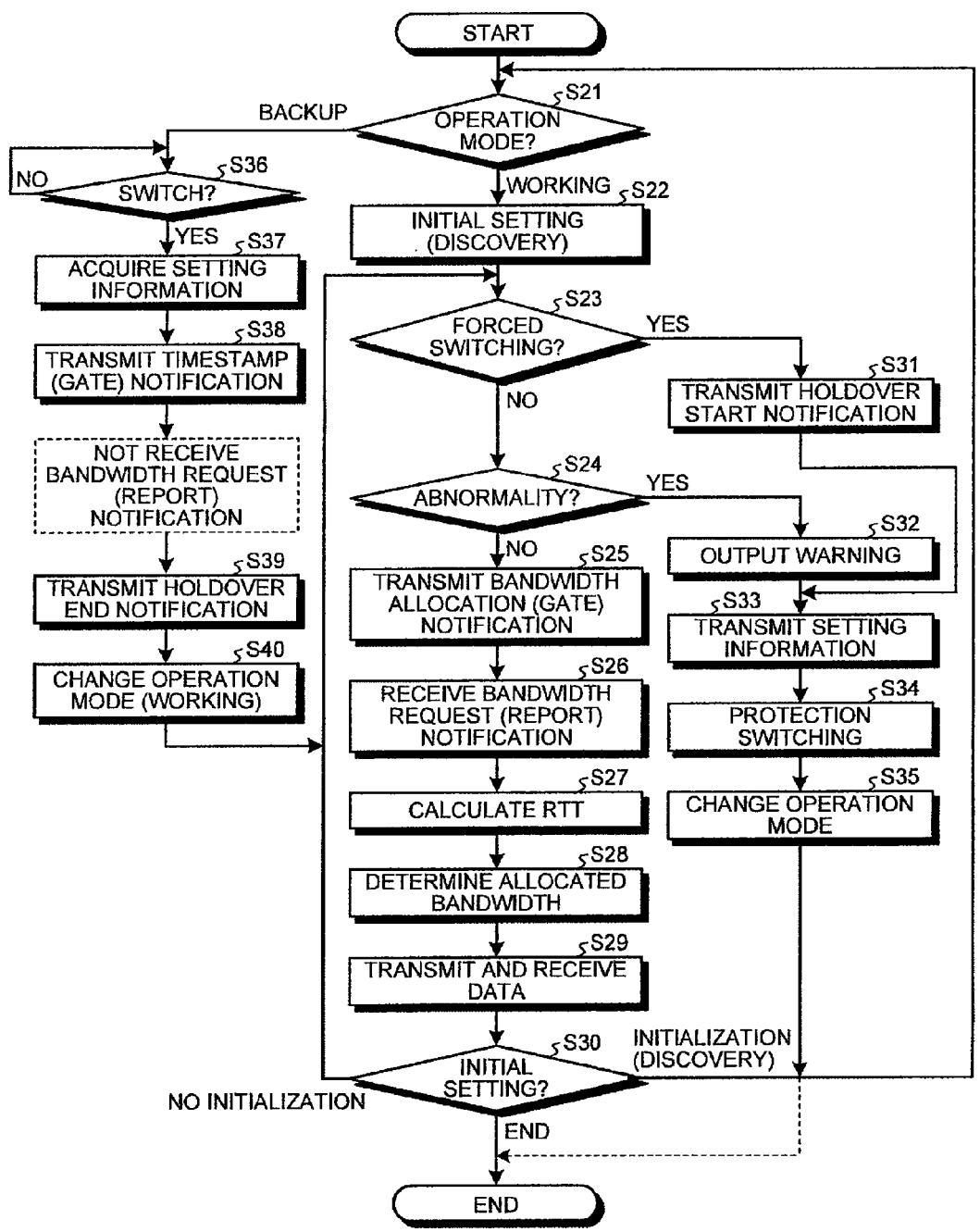
FIG. 12 is a flowchart for explaining processing by a control unit on a station side in the third embodiment of the present invention.

FIG. 12 is a flowchart for explaining processing executed by the PON control unit 2 of the OLT. When the PON control unit 2 is started, the PON control unit 2 determines whether the operation of the own apparatus is working operation or backup operation (step S21). When a mode is not a working mode, the PON control unit 2 shifts to processing at step S36 and stays on standby as the backup PON control unit until switching of the mode is performed.

Operation in the Working Mode (Normal Time)

When the operation mode is the working mode, the PON control unit 2 starts discovery processing (step S22). When establishment of a logical link and registration of the ONU 10 by the discovery processing are completed, the PON control unit 2 determines whether a cause of forced switching of a communication circuit has occurred (step S23). The cause of forced switching is, for example, the forced switching by the intention of the user explained above. When the PON control unit 2 receives an instruction signal from an external input device connected to the PON control unit 2 or through a network, the PON control unit 2 determines that the forced switching is necessary. If there is no cause of forced switching, the PON control unit 2 performs detection of line abnormality (step S24).

When there is no line abnormality, the PON control unit 2 notifies the ONUs 10 of bandwidth allocation information using GATE (step S25) and receives REPORT from the ONUs 10 (step S26). Subsequently, the PON control unit 2 calculates RTT of the ONUs based on a timestamp included in REPORT (step S27). The PON control unit 2 determines transmission bandwidths allocated to the ONUs 10 based on the requested bandwidth information of REPORT and the RTT (step S28). In parallel to these kinds of processing, the PON control unit 2 performs transmission and reception data of a present bandwidth update period (step S29). Subsequently, the PON control unit 2 determines whether the discovery processing is necessary (step S30). When the discovery processing is unnecessary, the PON control unit 2 returns to step S23. When the discovery processing is necessary, the PON control unit 2 returns to step S21. To discover the ONU 10 connected anew or the ONU 10 started anew, the discovery processing is regularly executed. When it is necessary to shut down the OLT, the PON control unit 2 ends the processing.

Operation in the Working Mode (During a Switching Operation)

When the PON control unit 2 determines at step S23 that the forced switching is necessary, the PON control unit 2 transmits deferred state start notification (holdover start notification) (step S31) and shifts to processing at step S33. When the PON control unit 2 detects line abnormality at step S24, the PON control unit 2 performs warning output processing at step S32. Subsequently, the PON control unit 2 transmits setting information of the ONUs 10 to the bOLT (step S33). When the setting information is already shared with the bOLT, the PON control unit 2 does not have to transmit the information again.

Subsequently, the PON control unit 2 executes line switching processing (Protection switching processing) (step S34). When the PON control unit 2 performs the line switching, the PON control unit 2 transmits a switching instruction signal to the bOLT and stops the transmission of the control message to the ONU 10 (step S35). When the line switching processing ends, thereafter, the PON control unit 2 rewrites operation mode information to "backup", returns to step S21, and starts the operation of the backup PON control unit 2. When the line abnormality is unrecoverable abnormality or when it is necessary to shut down the own apparatus during the forced switching or the like, the PON control unit 2 does not shift to the operation of the backup PON control unit 2 and performs shutdown of the own apparatus to end the processing.

Operation in the Backup Mode

The operation of the PON control unit 2 performed when the operation mode is the backup mode is explained. At step S36, the PON control unit 2 monitors whether line switching is necessary and stays on standby until the line switching becomes necessary. The PON control unit 2 executes the line switching when the PON control unit 2 receives a switching instruction signal from the wOLT or when the PON control unit 2 monitors the operation of the wOLT and determines that abnormality has occurred. In performing the switching, the PON control unit 2 of the bOLT transmits a signal for notifying that the switching is performed to the wOLT and the switching device 8. The switching device 8 that receives this switching instruction signal thereafter switches the connection to the network to the bOLT side.

Subsequently, the PON control unit 2 acquires setting information from the wOLT (step S37) and transmits GATE including a timestamp to the ONUs 10 using the setting information (step S38). In the PON protection system, the splitter 40 relays an upstream signal from the ONU 10 to both the working and backup lines 30-1 and 30-2. Therefore, the PON control unit 2 of the bOLT can receive a signal from the ONU 10 even when the PON control unit 2 is operating as the backup PON control unit 2. Therefore, when the PON control unit 2 is in the standby state at step S36, the PON control unit 2 can always monitor setting information included in the upstream signal and acquire the setting information in advance.

The ONU 10 during the holdover period does not transmit an upstream signal. Therefore, REPORT responding to GATE is not sent to the PON control unit 2. Therefore, the PON control unit 2 can transmit a control message for instructing holdover completion without waiting for reception of REPORT (step S39). GATE and holdover completion can be notified by one control message. As a control message for synchronization, a control message other than GATE can also be used.

The PON control unit 2 that has transmitted the holdover completion notification rewrites the operation mode information to "working" and thereafter operates as the working PON control unit 2 (step S40). When the PON control unit 2 starts the operation of the working PON control unit 2 after the line switching, the PON control unit 2 resumes communication using setting information taken over from the wOLT. Therefore, the discovery processing (step S22) can be omitted. Therefore, suspension time of communication is reduced.

In this embodiment, unlike the first embodiment, the holdover state can be ended without using the control message for holdover completion.

According to the third embodiment, it is possible to shift to the deferred period without waiting for expiration of the error detection period. Therefore, it is possible to instantaneously perform line switching and suppress a situation in which suspension of communication gives a sense of discomfort to the user. For example, when sound communication is performed, instantaneous interruption of a line and an arrival delay of a signal cause a problem in communication in which real-time properties are required. However, in this embodiment, it is possible to solve the problem.

When line switching is necessary, if a master station suddenly transmits a signal to a slave station using a line having a different communication path, the slave station detects an out-of-synchronization warning and resetting of communication is necessary. As a result, the suspension time is long. However, in this embodiment, a detection deferred time for out of synchronization is provided. During switching, the slave station quickly shifts to the detection deferred period and resumes communication after synchronizing with the host station. Therefore, it is possible to resume communication early.

The embodiments of the present invention are explained above. The present invention is not limited to the embodiments. Any modification of the embodiments can be made as long as the modification is included in the gist of the invention. For example, a communication system to which the communication method of the embodiments is applied does not have to be a PON system. The communication method can also be applied to an optical communication system in which an active device is used. The communication method is not limited to optical communication and can also be applied to a communication system in which terminals communicate using an electric signal.

The processing of the PON control unit 2 of the OLT shown in FIG. 12 can also be applied to the first embodiment or the second embodiment. In the case of the second embodiment, the holdover start notification does not have to be carried out. Therefore, step S31 can be omitted. In the case of the first embodiment, in addition to the holdover start notification, the holdover completion notification does not have to be carried out. Therefore, steps S31 and S39 can be omitted. The PON control unit 2 (a PON processor) of the OLT can execute processing using a computer program executable by a computer. Therefore, the processing shown in FIG. 12 can be described using a computer program.

Figure 13:
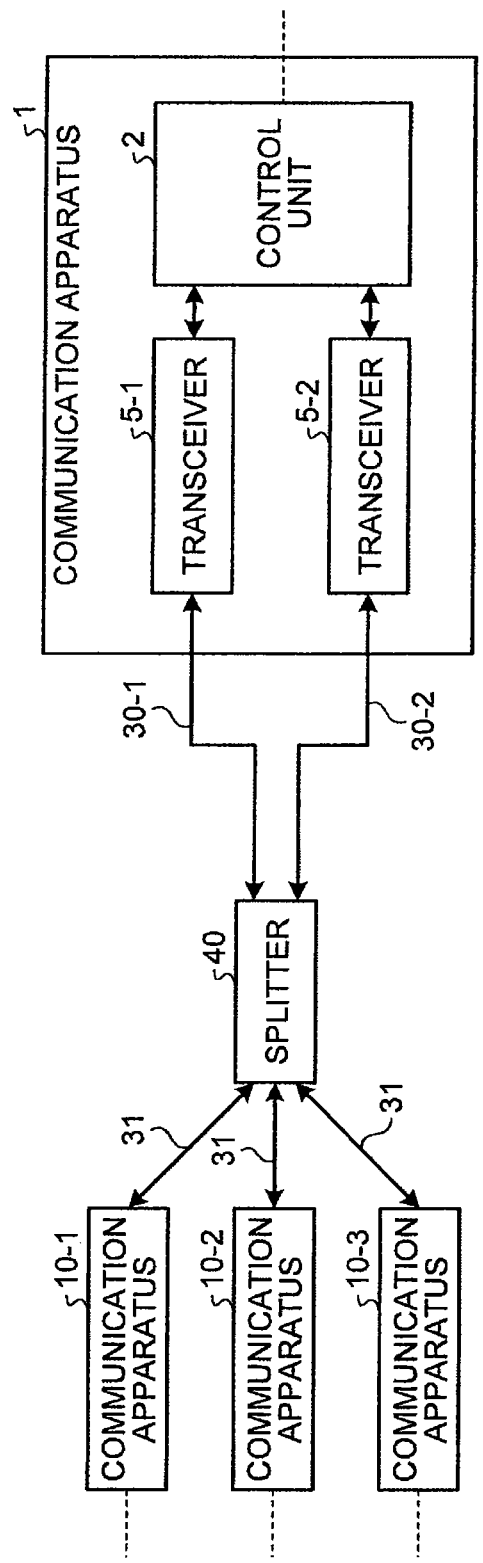
FIG. 13 is a configuration diagram of the configuration of a communication system in an embodiment of the present invention.

In the first to third embodiments, as shown in FIG. 1, a plurality of the control units 2-1 and 2-2 of the master station are provided to correspond to the transceivers 5-1 and 5-2. However, as shown in FIG. 13, the control units 2 can be one device. In this case, the exchange of setting information between the control units 2-1 and 2-2 and the switching device 8 are made unnecessary.

In the embodiments, not only the application example to the general-purpose communication system but also the application example to IEEE802.3 is explained. However, the present invention is not limited to the application examples. The present invention can also be carried out in communication systems employing other protocols.

The slave station 10 and the splitter 40 can be connected by redundant lines as well.

INDUSTRIAL APPLICABILITY

The present invention is suitable for a communication system in which communication lines are made redundant and a switching method for the communication lines.

REFERENCE SIGNS LIST

- 1 communication apparatus
- 2-1, 2-2 control units
- 3, 13 reception buffers
- 4, 12 transmission buffers
- 5-1, 5-2, 14 optical transceivers
- 6, 15 WDMs
- 7, 16-1, 16-2 PHYs
- 10-1 to 10-3 communication apparatuses
- 11 PON control unit
- 11a controller
- 11b, 11e timers
- 11c out-of-synchronization warning unit
- 11d line-abnormality warning unit
- 11f memory
- 20-1, 20-2 terminals
- 30-1, 30-2 communication lines
- 31 subscriber line
- 40 splitter
- 51, 142, 161-1, 161-2 Rxs
- 52, 141, 162-1, 162-2 Txs

The invention claimed is:

1. A communication line switching method for an optical communication system in which a station-side optical line terminal apparatus (OLT) and user-side optical line terminal apparatuses (ONUs) are connected via a plurality of redundant physical lines, the communication line switching method comprising:
a discovery step of the OLT registering the ONU;
a monitoring step of the registered ONU monitoring a time stamp drift error that is generated when a difference between a time stamp included in a received signal and a local time measured by the own apparatus is larger than a value set in advance and, when the time stamp drift error occurs, shifting to a deregistered state and waiting for registration by the discovery step;
a switching step of the OLT switching a physical line from a working physical line to a backup physical line of the physical lines; and
a holdover step of the ONU in the registered state shifting to an holdover state for suppressing a shift to the deregistered state due to occurrence of the time stamp drift error by the monitoring step in a holdover period set in advance even if line abnormality is detected.

2. The communication line switching method according to claim 1, wherein
the discovery step is a step of the OLT transmitting and receiving a control message to and from the ONUs via the working physical line to thereby discover the ONU in a communicable state, registering the ONU, and transmitting setting information of a logical link to the registered ONU to establish the logical link, and
the communication line switching method further comprises a communication step of the ONU, which has shifted to the registered state according to the discovery step, communicating with the OLT using the logical link.

3. The communication line switching method according to claim 1, wherein
in the holdover step, the ONU does not directly shift to the deregistered state during the holdover period, maintains setting information of a logical link to perform reception of a downstream signal from the OLT, and suppresses transmission of an upstream signal, and
the communication line switching method further comprises:
a step of the ONU in the holdover state releasing the suppression of the transmission of the upstream signal and returning to the registered state when communication in a backup physical line becomes possible in the holdover period; and
a step of the ONU in the holdover state shifting to the deregistered state and waiting for registration by the discovery step when the communication in the backup physical line does not become possible in the holdover period and the holdover period expires.

4. The communication line switching method according to claim 1, further comprising:
a step of the OLT transmitting a time stamp to the ONU after the switching step; and
a step of the ONU synchronizing, when receiving the time stamp during the holdover period, the local time with the received time stamp and shifting from the holdover state to the registered state.

5. The communication line switching method according to claim 1, further comprising:
a step of the OLT transmitting, after the switching step, an instruction message for instructing an end of the holdover state to the ONU; and
a step of the ONU, which has received the instruction message, releasing the suppression of the shift to the deregistered state due to the timestamp drift error and shifting to the registered state.

6. The communication line switching method according to claim 5, wherein
the OLT is connected to a plurality of the ONUs via a splitter connected to the physical lines and performs unicast communication with the ONUs in a time-division multiplexing manner, and
the instruction message is an extended MPCP (Multi-Point Control Protocol) message addressed to the ONUs or a plurality of extended OAM (Operation Administration and Maintenance) messages addressed to the respective ONUs.

7. The communication line switching method according to claim 1, further comprising:
a step of the OLT transmitting a shift message for instructing a shift to the holdover state to the ONU in the registered state; and
the ONU, which has received the shift message, shifting to the holdover state.

8. The communication line switching method according to claim 7, wherein
the OLT is connected to a plurality of the ONUs via a splitter connected to the physical lines and performs unicast communication with the ONUs in a time-division multiplexing manner, and
the instruction message is an extended MPCP (Multi-Point Control Protocol) message addressed to the ONUs or a plurality of extended OAM (Operation Administration and Maintenance) messages addressed to the respective ONUs.

9. The communication line switching method according to claim 1, wherein, when the ONU shifts from the registered state to the holdover state, the ONU maintains LLID (Logical link identification) as setting information of a logical link and defers disconnection of the logical link.

10. The communication line switching method according to claim 1, wherein, when the ONU shifts from the registered state to the holdover state, the ONU maintains, as setting information of a logical link, a laser-off time of a transmitter notified from the OLT.

11. The communication line switching method according to claim 1, wherein, when the ONU has shifted from the registered state to the holdover state, the ONU maintains, as setting information of a logical link, a synchronization time of a received signal notified from the OLT.

12. The communication line switching method according to claim 1, wherein the ONU monitors a reception interval of reception signals using a warning timer in the registered state, suppresses a warning by the warning timer when the ONU has shifted to the holdover state, and initializes a state of the warning timer when the ONU returns from the holdover state to the registered state.

13. A communication apparatus comprising:
   a transceiver connected to a physical line and configured to transmit and receive a transmission signal using a logical link;
   a timer configured to measure a local time;
   a first warning unit configured to output an out-of-synchronization error based on a difference between time information of the transmission signal received by the transceiver and the local time;
   a second warning unit configured to detect line abnormality in the physical line based on a transmission interval of transmission signals received by the transceiver; and
   a control unit configured to shift to a deregistered state and perform initial setting when the out-of-synchronization error by the first warning unit is output and, on the other hand, when the second warning unit detects abnormality, during a period set in advance, suppress the shift to the deregistered state due to the out-of-synchronization error by the first warning unit.

14. The communication apparatus according to claim 13, wherein the control unit continues, during the period, reception by the transceiver while deferring discarding of setting information of the logical link, resumes transmission and reception by the transceiver without discarding the setting information after switching of the physical line, and, when the switching of the physical line is not normally performed, discards the setting information.

15. The communication apparatus according to claim 13, wherein the control unit synchronizes, when receiving the time information during the period, the local time with the received time information and releases the suppression.

16. The communication apparatus according to claim 13, wherein the control unit suppresses the shift to the deregisterd state due to the out-of-synchronization error until the control unit receives an end signal for the period from a communication partner before the period set in advance elapses.

17. The communication apparatus according to claim 13, wherein, when the control unit has received a signal for instructing start of the period from a communication partner via the transceiver, the control unit starts the period and suppresses the shift to the deregistered state due to the out-of-synchronization error by the first warning unit even if the line abnormality is not detected by the second warning unit.

18. The communication apparatus according to claim 13, wherein the period is a holdover period and the out-of-synchronization error is a timestamp drift error.

19. A station-side communication apparatus that performs communication with a plurality of user-side communication apparatuses via a plurality of redundant physical lines and a splitter that divides signals of the physical lines to a plurality of signal lines, the station-side communication apparatus comprising:
   a plurality of transceivers connected to the respective physical lines; and
   a control unit configured to start, when protection switching for switching a transceiver used for communication among the transceivers from a working transceiver to a backup transceiver is performed, communication via the backup transceiver using a link identifier used in the working transceiver and the physical line of the working transceiver and transmit a message for instructing end of a holdover state to the user-side communication apparatus that has shifted from a registered state to the holdover state.

20. The station-side communication apparatus according to claim 19, wherein the control unit transmits a shift message for instructing a shift to the holdover state to the user-side communication apparatus before performing the protection switching.

21. A communication system in which a station-side optical line terminal apparatus (OLT) and a user-side optical line terminal apparatus (ONU) perform communication via a plurality of redundant physical lines and a splitter using media access control by an IEEE802.3 standard, wherein
   the ONU monitors line abnormality of the physical lines, when Optical LoS or MAC LoS is detected as the line abnormality, shifts from a registered state to a holdover state and suppresses a shift to a deregistered state due to a time drift error in a period of the holdover state, and
   the OLT performs, even after protection switching, communication using an LLID before the switching with the ONU in the registered state.

22. The communication system according to claim 21, wherein
   the OLT transmits time information to the ONU after the protection switching; and
   the ONU synchronizes, when receiving the time information in the period of the holdover state, a local time with the received time information and shifts from the holdover state to the registered state.

23. The communication system according to claim 21, wherein, after the protection switching, the OLT transmits an instruction message for instructing end of the holdover state.

24. The communication system according to claim 21, wherein, before the protection switching, the OLT transmits a shift message for a forced shift to the holdover state to the ONU in the registered state.

25. A control device for a user-side optical line terminal apparatus that communicates with a station-side optical line terminal apparatus via a splitter that divides an optical signal, the station-side optical line terminal apparatus and the splitter being connected by a plurality of redundant physical lines, wherein
   the control device monitors a timestamp drift error that is generated when a difference between a timestamp included in a received signal and a local time measured by the own apparatus is larger than a value set in advance and, when the timestamp drift error has occurred, shifts to a deregistered state and waits for registration by discovery processing of the station-side optical line terminal apparatus and, on the other hand, when line abnormality of the physical lines is detected, suppresses a shift to the deregistered state due to occurrence of the timestamp drift error during a holdover period set in advance.

26. The control device according to claim 25, wherein, during the holdover period, the control device does not directly shift to a deregistered state, which is a state before discovery processing, maintains setting information of a logical link on the physical lines to perform reception of a downstream signal, and shifts to a holdover state for suppressing transmission of an upstream signal.

27. The control device according to claim 25, wherein the control device synchronizes, when receiving a signal including the time stamp during the holdover period, the local time with the time stamp and ends the holdover period.

28. The control device according to claim 25, wherein, during the holdover period, the control device suppresses the shift to the deregistered state due to occurrence of the time stamp drift error until the control device receives an end signal for the holdover period from a communication partner.

29. The control device according to claim 25, wherein, when a shift message for a shift to the holdover state is received from the station-side optical line terminal apparatus, the control device shifts to the holdover state even before detection of the line abnormality.

* * * * *